United States Patent
Matsushima

(10) Patent No.: US 7,451,307 B2
(45) Date of Patent: Nov. 11, 2008

(54) COMMUNICATION APPARATUS, COMMUNICATION SYSTEM, COMMUNICATION APPARATUS CONTROL METHOD AND IMPLEMENTATION PROGRAM THEREOF

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 690 days.

(21) Appl. No.: 10/938,563

(22) Filed: Sep. 13, 2004

(65) Prior Publication Data
US 2005/0097314 A1    May 5, 2005

(30) Foreign Application Priority Data
Sep. 22, 2003  (JP)  ............................... 2003-329219
Jul. 20, 2004  (JP)  ............................... 2004-211394

(51) Int. Cl.
H04L 9/00   (2006.01)
(52) U.S. Cl. ........................... 713/156; 380/30; 380/33; 380/273; 380/277; 713/158; 713/176; 713/168; 713/169
(58) Field of Classification Search ................. 713/156, 713/168–169, 175–176; 380/30, 33, 273, 380/277
See application file for complete search history.

(56) References Cited

U.S. PATENT DOCUMENTS

| 5,781,723 | A  | * | 7/1998 | Yee et al. ...................... 726/20 |
| 2004/0255113 | A1 | * | 12/2004 | Ogura ......................... 713/156 |
| 2005/0091485 | A1 | * | 4/2005 | Imai ............................. 713/156 |
| 2005/0097314 | A1 |   | 5/2005 | Matsushima |
| 2005/0097332 | A1 | * | 5/2005 | Imai ............................. 713/176 |
| 2005/0138360 | A1 | * | 6/2005 | Kamalakantha ............. 713/156 |
| 2007/0198830 | A1 | * | 8/2007 | Imai ............................. 713/156 |

FOREIGN PATENT DOCUMENTS

| JP | 2002-251492 | 9/2002 |
| JP | 2002-353959 | 12/2002 |
| JP | 2004-5505 | 1/2004 |

OTHER PUBLICATIONS

U.S. Appl. No. 10/665,754, filed Sep. 22, 2003, Matsushima.
U.S. Appl. No. 10/650,715, filed Aug. 29, 2003, Matsushima.
U.S. Appl. No. 10/025,758, filed Dec. 26, 2001, Matsushima.
U.S. Appl. No. 09/985,484, filed Nov. 5, 2001, Matsushima.
U.S. Appl. No. 09/985,367, filed Nov. 2, 2001, Matsushima.
U.S. Appl. No. 09/753,582, filed Jan. 4, 2001, Matsushima.
U.S. Appl. No. 12/051,226, filed Mar. 19, 2008, Matsushima.

* cited by examiner

*Primary Examiner*—Kambiz Zand
*Assistant Examiner*—Yonas Bayou
(74) *Attorney, Agent, or Firm*—Oblon, Spivak, McClelland, Maier & Neustadt, P.C.

(57) ABSTRACT

A communication apparatus, a communication system, a communication apparatus control method and a recording medium for storing an implementation program thereof are disclosed. The communication apparatus includes a communication part providing a communicating party with an individual certificate with identification information thereof as via a first address and a common certificate without the identification information via a second address; a request execution part executing a process corresponding to a request received from the communicating party; and a denial part denying any process corresponding to requests other than a request to set the individual certificate in communication via the second address. According to the invention, it is possible to easily maintain a condition where authentication can be properly performed while maintaining security of communication.

22 Claims, 20 Drawing Sheets

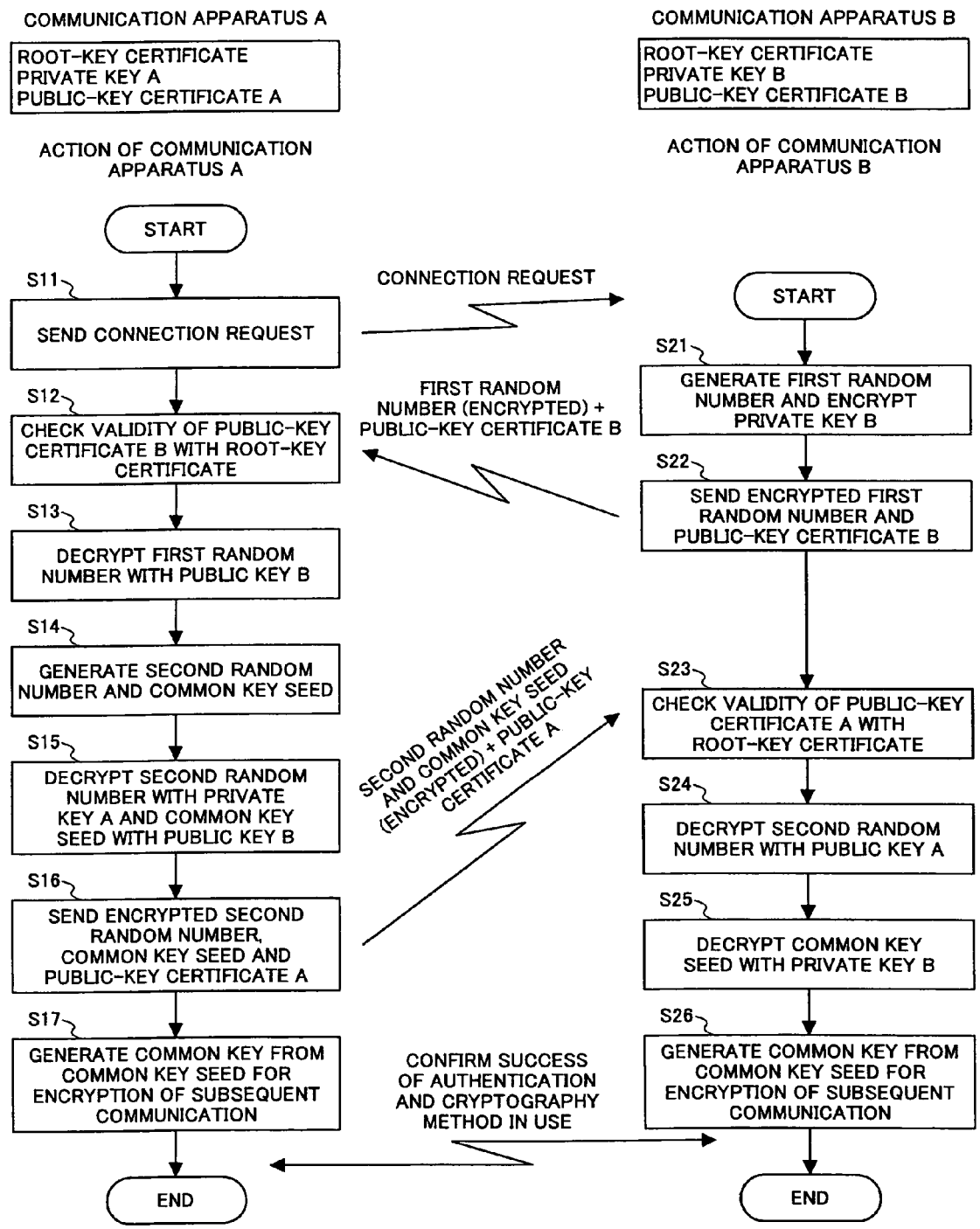

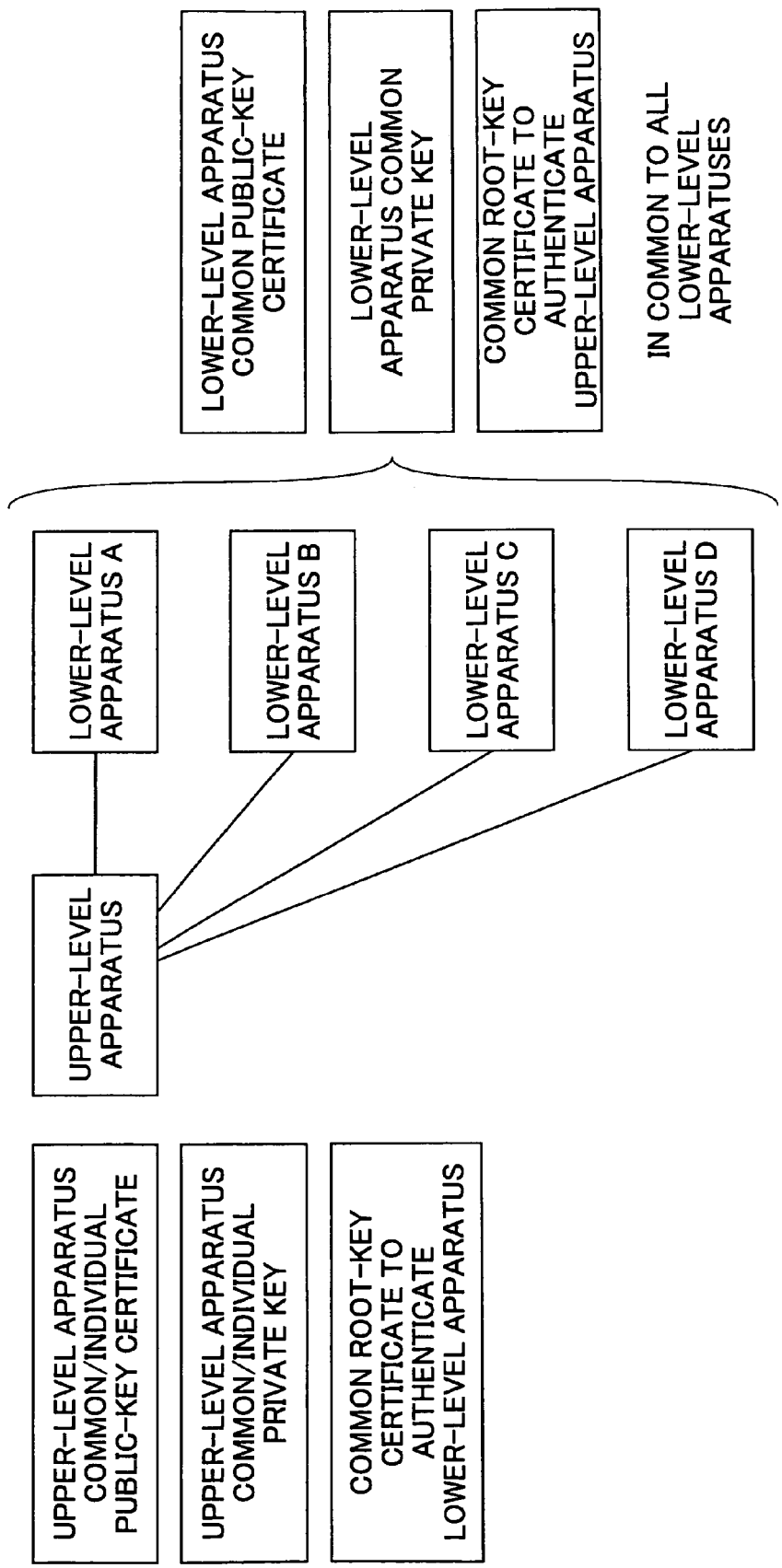

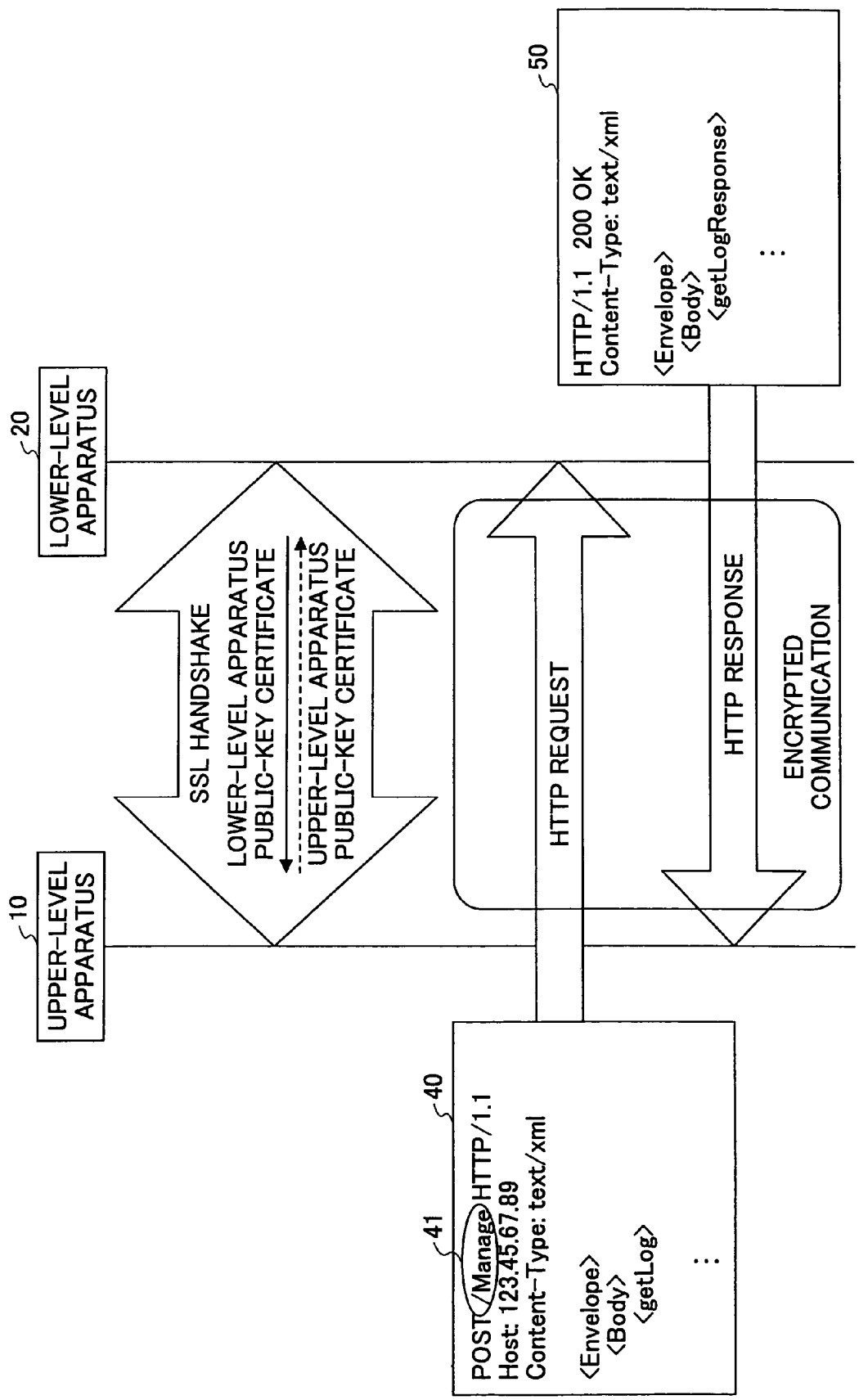

URL STRUCTURE https://123.45.67.89:10000/Manage/···/···
HOST  PORT  URL PATH

FIG.13

| URL | TARGET SECOND DISTRIBUTION PART |
|---|---|
| http://123.45.67.89:10000/ (NORMAL URL) | NORMAL URL SECOND DISTRIBUTION PART |
| http://123.45.67.90:10001/ (RESCUE URL) | RESCUE URL SECOND DISTRIBUTION PART |

FIG.14A

TABLE REFERRED TO BY NORMAL URL SECOND DISTRIBUTION PART

| REQUEST TYPE | TARGET FUNCTION UNIT |
|---|---|
| ACQUIRE SPECIFIC INFORMATION (ID) | SPECIFIC INFORMATION ACQUISITION FUNCTION (ID) |
| ACQUIRE SPECIFIC INFORMATION (MODEL) | SPECIFIC INFORMATION ACQUISITION FUNCTION (MODEL) |
| ACQUIRE SPECIFIC INFORMATION (FIRM) | SPECIFIC INFORMATION ACQUISITION FUNCTION (FIRM) |
| ... | ... |
| ACQUIRE SPECIFIC INFORMATION (CERTIFICATE) | SPECIFIC INFORMATION ACQUISITION FUNCTION (CERTIFICATE) |
| EXECUTE FUNCTION A (REQUEST A1) | FUNCTION A (LOGIC A1) |
| ... | ... |
| SET CERTIFICATE | CERTIFICATE SETTING FUNCTION |

FIG.14B

TABLE REFERRED TO BY RESCUE URL SECOND DISTRIBUTION PART

| REQUEST TYPE | TARGET FUNCTION UNIT |
|---|---|
| ACQUIRE SPECIFIC INFORMATION (ID) | SPECIFIC INFORMATION ACQUISITION FUNCTION (ID) |
| ACQUIRE SPECIFIC INFORMATION (MODEL) | SPECIFIC INFORMATION ACQUISITION FUNCTION (MODEL) |
| ACQUIRE SPECIFIC INFORMATION (CERTIFICATE) | SPECIFIC INFORMATION ACQUISITION FUNCTION (CERTIFICATE) |
| SET CERTIFICATE | CERTIFICATE SETTING FUNCTION |

FIG.18

```
POST /Manage HTTP/1.1
Host: 123.45.67.90:10001
Content-Type: text/xml; charset=UTF-8
Content-Length: nnnn
SOAPAction: "http://foo.bar.com/Manage/setCert"       ─── 61

<SOAP-ENV:Envelope
  xmlns:SOAP-ENV = "http://schemas.xmlsoap.org/soap/envelope/"
  xmlns:ns = "http://foo.bar.com/Manage/"
  SOAP-ENV:encodingStyle = "http://schemas.xmlsoap.org/soap/encoding/"
>
  <SOAP-ENV:Header/>
  <SOAP-ENV:Body>         ─── 62
    <ns:setCert>                      ─── 63
      <version>1.0.1</version>              ─── 64
      <password>Hello, World</password>
      <certificate>
        ABCDEFGHIJKLMN012345......
        ABCDEFGHIJKLMN012345......
        ABCDEFGHIJKLMN012345......  ── 65
        ABCDEFGHIJKLMN012345......
      </certificate>
    </ns:setCert>
  </SOAP-ENV:Body>
</SOAP-ENV:Envelope>
```

FIG.19

```
HTTP/1.1 200 OK
Content-Type: text/xml; charset=UTF-8
Content-Length: nnnn

<SOAP-ENV:Envelope
  xmlns:SOAP-ENV = "http://schemas.xmlsoap.org/soap/envelope/"
  xmlns:ns = "http://foo.bar.com/Manage/"
  SOAP-ENV:encodingStyle = "http://schemas.xmlsoap.org/soap/encoding/"
>
  <SOAP-ENV:Header/>
  <SOAP-ENV:Body>             ─── 71
    <ns:setCertResponse>          ─── 72
      <result>OK</result>
    </ns:setCertResponse>
  </SOAP-ENV:Body>
</SOAP-ENV:Envelope>
```

FIG.20

```
POST /Manage HTTP/1.1
Host: 123.45.67.90:10001
Content-Type: text/xml; charset=UTF-8
Content-Length: nnnn
SOAPAction: "http://foo.bar.com/Manage/getStatus"          —81

<SOAP-ENV:Envelope
   xmlns:SOAP-ENV = "http://schemas.xmlsoap.org/soap/envelope/"
   xmlns:ns = "http://foo.bar.com/Manage/"
   SOAP-ENV:encodingStyle = "http://schemas.xmlsoap.org/soap/encoding/"
>
   <SOAP-ENV:Header/>
   <SOAP-ENV:Body>          —82
      <ns:getStatus/>
   </SOAP-ENV:Body>
</SOAP-ENV:Envelope>
```

FIG.21

```
HTTP/1.1 500 INternal Server Error
Content-Type: text/xml; charset=UTF-8
Content-Length: nnnn <SOAP-ENV:Envelope
   xmlns:SOAP-ENV = "http://schemas.xmlsoap.org/soap/envelope/"
   xmlns:ns = "http://foo.bar.com/Manage/"
   SOAP-ENV:encodingStyle = "http://schemas.xmlsoap.org/soap/encoding/"
>
   <SOAP-ENV:Header/>
   <SOAP-ENV:Body>
      <SOAP-ENV:Fault>
         <faultcode>SOAP-ENV:Client</faultcode>
         <faultstring>No such operation: getStatus</faultstring>
      </SOAP-ENV:Fault>
   </SOAP-ENV:Body>                                              91
</SOAP-ENV:Envelope>
```

FIG.23

| URL | REQUEST TYPE | TARGET FUNCTION UNIT |
|---|---|---|
| http://123.45.67.89: 10000/ (NORMAL URL) | ACQUIRE SPECIFIC INFORMATION (ID) | SPECIFIC INFORMATION ACQUISITION FUNCTION (ID) |
| | ACQUIRE SPECIFIC INFORMATION (MODEL) | SPECIFIC INFORMATION ACQUISITION FUNCTION (MODEL) |
| | ACQUIRE SPECIFIC INFORMATION (FIRM) | SPECIFIC INFORMATION ACQUISITION FUNCTION (FIRM) |
| | ... | ... |
| | ACQUIRE SPECIFIC INFORMATION (CERTIFICATE) | SPECIFIC INFORMATION ACQUISITION FUNCTION (CERTIFICATE) |
| | EXECUTE FUNCTION A (REQUEST A1) | FUNCTION A (LOGIC A1) |
| | ... | ... |
| | SET CERTIFICATE | CERTIFICATE SETTING FUNCTION |
| http://123.45.67.90: 10001/ (RESCUE URL) | ACQUIRE SPECIFIC INFORMATION (ID) | SPECIFIC INFORMATION ACQUISITION FUNCTION (ID) |
| | ACQUIRE SPECIFIC INFORMATION (MODEL) | SPECIFIC INFORMATION ACQUISITION FUNCTION (MODEL) |
| | ACQUIRE SPECIFIC INFORMATION (CERTIFICATE) | SPECIFIC INFORMATION ACQUISITION FUNCTION (CERTIFICATE) |
| | SET CERTIFICATE | CERTIFICATE SETTING FUNCTION |

COMMUNICATION APPARATUS, COMMUNICATION SYSTEM, COMMUNICATION APPARATUS CONTROL METHOD AND IMPLEMENTATION PROGRAM THEREOF

BACKGROUND OF THE INVENTION

1. Field of the Invention

The present invention generally relates to a communication apparatus, a communication system, a communication apparatus control method and an implementation program thereof.

More particularly, the present invention relates to a communication apparatus that has communication means and provides digital certificates to be authenticated by a communicating party for communication.

Furthermore, the present invention relates to a communication system having a lower-level communication apparatus such as the above-mentioned communication apparatus and an upper-level communication apparatus working as a communicating party of the communication apparatus.

Furthermore, the present invention relates to a communication apparatus control method for providing digital certificates to be authenticated by a communicating party for communication.

Furthermore, the present invention relates to a program to cause a computer to behave as the above-mentioned communication apparatus.

2. Description of the Related Art

Conventionally, a variety of communication systems have been constructed to have structure in which one or more communication apparatuses having respective communication functions are connected to communicate each other via networks. For example, such systems include a so-called "electric commerce system". In an electric commerce system, orders for commodities are sent from computers, such as personal computers (PCs), working as client apparatuses, and these orders are received at server apparatuses capable of communication to PCs via the Internet. Also, a remote management system for electronic apparatuses is proposed. In such a system, various types of electronic apparatuses, some of which work as client apparatuses and others of which work as server apparatuses, are connected via a network and are managed through mutual communication.

In construction of such a system, when an entity attempts to communicate to another entity, it is indispensable to check whether these entities are appropriate communicating parties and additionally whether transmitted information has been not tampered. Especially, in case of communication via the Internet, information is often routed through irrelevant computers until the information reaches the communicating parties. Thus, it is necessary to prevent contents of confidential information from being eavesdropped during transmission thereof. A communication protocol such as SSL (Secure Socket Layer) has been designed and widely used for that need. In communication in compliance with this protocol, if a communicating party is authenticated and information contents are encrypted in accordance with a combination of public-key cryptography and common-key cryptography, it is possible to properly prevent such tempering and eavesdropping. Also, a destination apparatus can authenticate a source apparatus requesting the communication.

For example, Japanese Laid-Open Patent Applications No. 2002-353959 and No. 2002-251492 disclose techniques related to authentication based on SSL and public-key cryptography.

Now, an exemplary communication procedure of cross-certification in compliance with SSL is described wherein an authentication process portion thereof is focused.

FIG. 1 is a flowchart of exemplary respective operations executed by communication apparatuses A and B for conventional cross-certification in compliance with SSL.

Referring to FIG. 1, in cross-certification in accordance with SSL, each of the communication apparatuses A and B must be provided in advance with a root-key certificate, a private key and a public-key certificate. The private key is issued to each communication apparatus by a certificate authority (CA). The public-key certificate is a digital certificate created by CA in such a way that a digital signature is attached to a public key corresponding to the private key. The root-key certificate is a digital certificate created by CA in such a way that a digital signature is attached to a root key corresponding to a root private key to generate the digital signature of the public-key certificate.

FIGS. 2A and 2B show exemplary relations among these elements.

Referring to FIG. 2A, a public key A is composed of a key body to decrypt a document encrypted with a private key A and bibliographic information having some information items, for example, including CA issuing the public key A and a term of validity. In order to show that the key body and the bibliographic information are not tampered, CA uses a root private key to encrypt a hash value obtained by hashing the public key A, and attaches the hash value as a digital signature to the public key A. At this time, CA adds identification information of the root private key in use for the digital signature as signature key information to the bibliographic information of the public key A. This public-key certificate having the digital signature is the public-key certificate A.

When an authentication process is performed by using the public-key certificate A, the key body of the corresponding root public key is used to decrypt the attached digital signature. If the decryption is successfully completed, it can be concluded that CA attached the digital signature. In addition, if the hash value obtained by hashing the public key A matches a hash value obtained by decrypting the digital signature, it can be determined that the key itself has not been also damaged and tampered. Furthermore, if the received data can be successfully decrypted with the public key A, it can be concluded that the data was sent from an owner of the private key A.

Here, in order to conduct such authentication, the root key must be stored in advance. As shown in FIG. 2B, this root key is stored as a root-key certificate to which CA attaches a digital signature. The root-key certificate is created in a self-signing form in which the digital signature can be decrypted with a root public key included therein. In order to use the root public key, the key body of the root-key certificate is used to decrypt the digital signature, and a hash value obtained by the decryption is compared to a hash value obtained by hashing the root public key. If these values are the same, it can be determined that the root public key has not been damaged and tampered.

The flowchart of FIG. 1 is described in detail. In FIG. 1, illustrated arrows between two respective process streams executed by the two communication apparatuses A and B represent data transfer. In the flowchart, each arrow means that a transmitter transmits information at a process step shown in the arrow source of the arrow. Also, it is supposed that in response to receipt of the transmitted information, the corresponding receiver performs a process step shown in the arrow head of the arrow. In addition, if a step is not successfully completed, a response to report authentication failure is returned at this time, and then the process is halted. If such authentication failure response is received from the other communicating party or the process is timed out, the process is halted.

In the illustration, the communication apparatus A requests to establish communication to the communication apparatus B. In this case, in response to execution of a predetermined control program by CPU (Central Processing Unit) of the communication apparatus A, the process stream shown in the left-hand side of FIG. 1 is initiated. At step S11, the communication apparatus A sends a connection request to the communication apparatus B.

In response to receipt of the connection request, CPU of the communication apparatus B executes a predetermined control program, and then the process stream shown in the right-hand side of FIG. 1 is initiated. At step S21, the communication apparatus B generates a first random number, and then uses a private key B to encrypt the first random number. At step S22, the communication apparatus B sends the encrypted first random number and a public-key certificate B to the communication apparatus A.

At the side of the communication apparatus A, when receiving the encrypted first random number and the public-key certificate B, the communication apparatus A checks whether the public-key certificate B is valid by using a root key certificate possessed by the communication apparatus A at step S12.

If the public-key certificate B is determined to be valid, the communication apparatus A uses a public key in the received public-key certificate B to decrypt the first random number at step S13. If the decryption is successfully completed, the communication apparatus A can make sure that the first random number was sent from the party to which the public-key certificate B was issued. At step S14, the communication apparatus A generates a second random number and a seed of a common key. This common key seed can be generated, for example, based on data exchanged in communication so far. At step S15, the communication apparatus A uses the private key A to encrypt the second random number, and uses the public key B to encrypt the common key seed. At step S16, the communication apparatus A sends these encrypted data together with the public-key certificate A to the communication apparatus B. The encryption of the common key seed is intended to make the common key seed secret to any apparatus other than the communication apparatus B. Then, at step S17, the communication apparatus A generates the common key to encrypt subsequent communication from the common key seed generated at step S14.

At the side of the communication apparatus B, when receiving the data sent at step S16 by the communication apparatus A, the communication apparatus B checks whether the public-key certificate A is valid based on a root-key certificate possessed by the communication apparatus B at step S23. If the public-key certificate A is determined to be valid, the communication apparatus B uses the public key A in the received public-key certificate A to decrypt the second random number. If the decryption is successfully completed, the communication apparatus B can make sure that the second random number was sent from the party to which the public-key certificate A was issued.

At step S25, the communication apparatus B uses the private key B to decrypt the common key seed. Through the communication so far, the common key seed can be shared by the communication apparatuses A and B. Also, this common key seed cannot be known to any apparatus other than the communication apparatus A generating the common key seed and the communication apparatus B possessing the private key B. If the process so far is successfully completed, the communication apparatus B can generate the common key for encryption of subsequent communication from the decrypted common key seed at step S26.

Then, after completion of steps S17 and S26 of the communication apparatuses A and B, respectively, the communication apparatuses A and B can confirm the success of cross-certification and identify the cryptographic scheme in use for subsequent communication. Then, the communication apparatuses A and B accept that the subsequent communication should follow the cryptographic scheme employing the generated common key, and the certification process is terminated. It is noted that the confirmation includes a response indicating that the authentication from the communication apparatus B has been successfully completed. In this manner, the communication between the communication apparatuses A and B is established each other, and the communication apparatuses A and B can subsequently communicate each other by encrypting data in the determined common key cryptographic scheme with the common key generated at step S17 or S26.

Through execution of the above authentication process, it is possible to safely share a common key between the communication apparatuses A and B and establish a secure communication path.

In the above process, the communication apparatus does not necessarily encrypt the second random number with the public key A and then send it together with the public-key certificate A to the communication apparatus B. In this case, steps S23 and S24 of the communication apparatus B may become unnecessary, and another exemplary authentication process corresponding to the case may be illustrated in FIG. 3. In the illustrated process, the communication apparatus B cannot authenticate the communication apparatus A. However, if the communication apparatus A only has to authenticate the communication apparatus B, the authentication process shown in FIG. 3 works satisfactorily. Also, in this case, only the root-key certificate has to be stored in the communication apparatus A. In other words, the private key A and the public-key certificate A may not be possessed by the communication apparatus A. On the other hand, the root-key certificate does not have to be possessed by the communication apparatus B.

Meanwhile, a term of validity is usually set to a public-key certificate in use of the above-mentioned authentication, and the public-key certificate is periodically updated. Also, in cases where a private key is apparently leaked or a root key is renewed, the public-key certificate is updated.

Such updating means may record such an updated public-key certificate in a recording medium and send the recording medium to a user by registered mail so that the user can update the public-key certificate securely.

However, if the updating means as described above is adopted, the user must be familiar to apparatus functions at some degree. Also, if the user fails to update the public-key certificate, the public-key certificate cannot be updated.

Thus, for the purpose of realizing reliable and easy updating, there is a demand that the public-key certificate can be sent from an apparatus capable of communicating to a communication apparatus to be updated and be automatically updated by the communication apparatus. In this case, not only the public-key certificate but also a private key are often updated. Thus, it is necessary to send the updated certificate and key via a secure path free from eavesdropping and tampering. For example, such a path may be a SSL-based communication path employing a key prior to the updating.

However, in automatic updating of such certificate and key, there is a risk that the updating may not succeed, for example, because a user carelessly powers off the communication apparatus during the updating operation. In this case, the certificate and key to be updated may be damaged. If such a situation occurs, authentication cannot be conducted by using the certificate and key any more. Thus, a managing apparatus thereof cannot identify the communication apparatus reliably, nor the certificate and key cannot be sent securely. In these cases, if the certificate has to be automatically updated, it is impossible to automatically update the certificate again due to failure of the previous updating.

In addition, in these cases, even if the apparatus communicates for purpose other than certificate updating, authentication cannot be properly conducted, and it is impossible to establish secure communication between the apparatus and another apparatus. Then, if the apparatus cannot help being untreated in such a condition, this may adversely affect normal operation of the apparatus.

SUMMARY OF THE INVENTION

It is a general object of the present invention to provide a communication apparatus, a communication system, a communication apparatus control method and a recording medium for storing an implementation program thereof in which one or more of the above-mentioned problems are eliminated.

A more specific object of the present invention is to provide a communication apparatus, a communication system, a communication apparatus control method and a recording medium for storing an implementation program thereof that can easily maintain a condition where authentication is properly performed while maintaining security.

In order to achieve the above-mentioned objects, there is provided according to one aspect of the present invention a communication apparatus, including: a communication part providing a digital certificate to a communicating party via a plurality of addresses so as to accept authentication and communicating to the communicating party via an address providing the digital certificate authenticated by the communicating party, wherein the communication part provides an individual certificate with identification information of the communication apparatus as the digital certificate via a first address of the plurality of addresses and a common certificate without the identification information as the digital certificate via a second address of the plurality of addresses; a request execution part executing a process corresponding to a request received from the communicating party by the communication part; and a denial part denying any process corresponding to requests other than a request to set the individual certificate in communication via the second address.

In an embodiment of the present invention, the communication apparatus may further include: an authentication part authenticating a digital certificate of the communicating party received from the communicating party, and when the authentication succeeds, permitting subsequent communication, wherein the request execution part may include an update part, in response to receipt of the request to set an individual certificate from the communicating party, updating the individual certificate.

In an embodiment of the present invention, the request to set an individual certificate may include a request to acquire individual information of the communication apparatus and a request to set the individual certificate.

In an embodiment of the present invention, the request execution part may include a plurality of request processing parts, each of the request processing parts performing a predefined process corresponding to the request.

In an embodiment of the present invention, the communication apparatus may further include: a distribution part distributing a request to one of the plurality of request processing parts in accordance with an address receiving the request and a type of the request, wherein the denial part may be implemented by causing the distribution part not to distribute any request other than at least one predetermined request to any of the plurality of request processing parts depending on an address in use.

In an embodiment of the present invention, the request may be described as a SOAP message.

In an embodiment of the present invention, the authentication may be performed in accordance with SSL or TLS, and the digital certificate may include a public-key certificate used for the authentication.

Additionally, there is provided according to another aspect of the invention a communication system, including: at least one lower-level apparatus; and at least one upper-level apparatus communicating to the at least one lower-level apparatus as a communicating party, wherein the at least one lower-level apparatus includes a communication part providing a digital certificate to the communicating party via a plurality of addresses so as to accept authentication and communicating to the communicating party via an address providing the digital certificate authenticated by the communicating party, wherein the communication part provides an individual certificate with identification information of the communication apparatus as the digital certificate via a first address of the plurality of addresses and a common certificate without the identification information as the digital certificate via a second address of the plurality of addresses; a request execution part executing a process corresponding to a request received from the communicating party by the communication part; and a denial part denying any process corresponding to requests other than a request to set the individual certificate in communication via the second address, and wherein the at least one upper-level apparatus includes an authentication part authenticating the at least one lower-level apparatus by using a digital certificate received from the at least one lower-level apparatus.

Additionally, there is provided according to another aspect of the invention a method of controlling a communication apparatus, including causing the communication apparatus to perform steps of: providing a digital certificate via a plurality of addresses so as to accept authenticate from a communicating party, wherein an individual certificate with identification information of the communication apparatus is provided as the digital certificate via a first address of the plurality of addresses, and a common certificate without the identification information is provided as the digital certificate via a second address of the plurality of addresses; communicating to the communicating party via an address providing the digital certificate authenticated by the communicating party; performing a process corresponding to a request received from the communicating party in the communication; and denying any process corresponding to processes other than a process to set the individual certificate in communication via the second address.

Additionally, there is provided according to another aspect of the invention a recording medium for storing a program to cause a computer to execute a procedure, the procedure including steps of: providing a digital certificate via a plurality of addresses so as to accept authenticate from a communicating party, wherein an individual certificate with identification information of the communication apparatus is provided as the digital certificate via a first address of the plurality of addresses, and a common certificate without the identification information is provided as the digital certificate via a second address of the plurality of addresses; communicating to the communicating party via an address providing the digital certificate authenticated by the communicating party; performing a process corresponding to a request received from the communicating party in the communication; and denying any process corresponding to processes other than a process to set the individual certificate in communication via the second address.

According to one aspect of the invention, it is possible to easily maintain a condition where authentication can be properly performed while maintaining security.

Other objects, features and advantages of the present invention will become more apparent from the following detailed description when read in conjunction with the accompanying drawings.

BRIEF DESCRIPTION OF THE DRAWINGS

FIG. 1 is a flowchart of exemplary respective operations executed by communication apparatuses for conventional cross-certification in compliance with SSL;

FIG. 6 is a block diagram illustrating another exemplary structure of a communication system according to an embodiment of the present invention;

FIG. 7 is a diagram to explain an outline of a communication scheme in the communication system shown in FIG. 4;

FIG. 13 shows an exemplary table to represent a correspondence between URLs receiving requests and second distribution parts to which a first distribution part distributes the requests according to an embodiment of the present invention;

FIGS. 14A and 14B show exemplary tables to represent correspondences between request types and function units to which the second distribution parts distribute the requests according to an embodiment of the present invention;

FIG. 18 shows exemplary codes of a HTTP request representing a certificate setting request sent from the upper-level apparatus to the lower-level apparatus via a rescue URL;

FIG. 19 shows exemplary codes of a HTTP response to the HTTP request shown in FIG. 18;

FIG. 20 shows exemplary codes of another HTTP request sent from the upper-level apparatus to the lower-level apparatus via a rescue URL;

FIG. 21 shows exemplary codes of a HTTP response to the HTTP request shown in FIG. 20;

FIG. 23 shows an exemplary table referred to by a second distribution part of the lower-level apparatus shown in FIG. 22.

DETAILED DESCRIPTION OF THE PREFERRED EMBODIMENTS

In the following, embodiments of the present invention will be described with reference to the accompanying drawings.

Exemplary structures of a communication apparatus and a communication system having the communication apparatus according to embodiments of the present invention are described.

Figure 4:
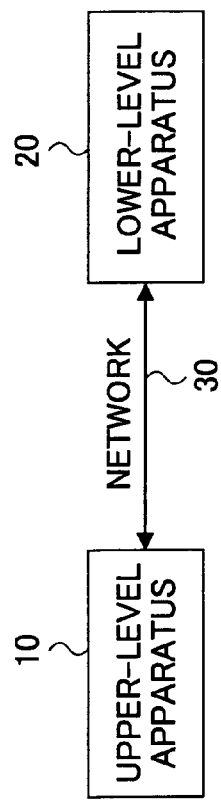
FIG. 4 is a block diagram illustrating an exemplary system structure of a communication system according to an embodiment of the present invention.

FIG. 4 is a block diagram illustrating an exemplary system structure of a communication system according to an embodiment of the present invention.

Referring to FIG. 4, the communication system includes an upper-level apparatus 10, a lower-level apparatus 20 and a network 30. In the communication system, the upper-level apparatus 10 and the lower-level apparatus 20 have respective communication functions, and are connected to each other via the network 30.

The network 30 may be wired and wireless, and include various types of communication lines (communication paths) of the network 30. Also, although only one lower-level apparatus 20 is illustrated herein, a communication system according to another embodiment may include a plurality of lower-level apparatuses 20 as illustrated FIG. 6.

An exemplary hardware configuration of the upper-level apparatus 10 and the lower-level apparatus 20 according to an embodiment of the present invention is described.

Figure 5:
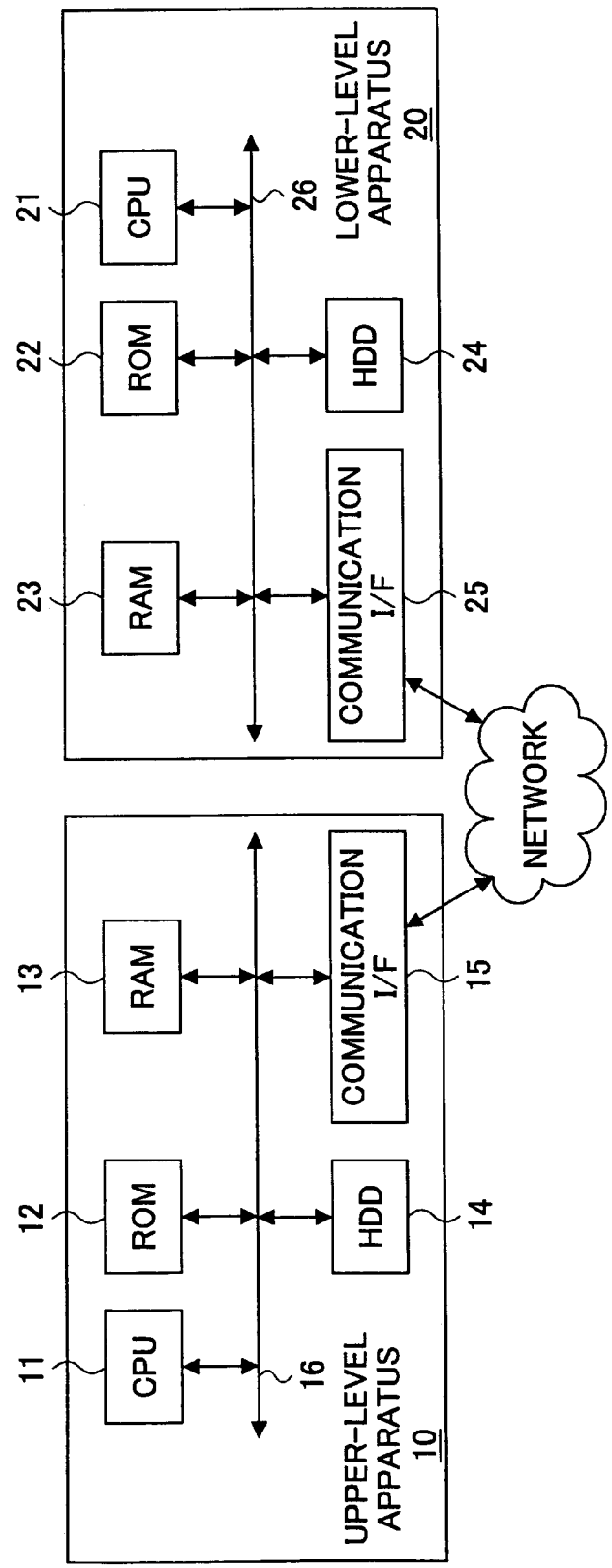
FIG. 5 is a block diagram illustrating an exemplary hardware configuration of an upper-level apparatus and a lower-level apparatus in the communication system shown in FIG. 4.

FIG. 5 is a block diagram illustrating an exemplary hardware configuration of the upper-level apparatus 10 and the lower-level apparatus 20 according to an embodiment of the present invention.

Referring to FIG. 5, the upper apparatus 10 includes CPU 11, ROM 12, RAM 13, HDD 14, a communication interface (I/F) 15 and a system bus 16, and these components are connected via the system bus 16. In order to implement some functions of the lower-level apparatus 20, such as authentication of a communicating party and renewal of a digital certificate of the lower-level apparatus 20, CPU 11 controls operation of the upper-level apparatus 10 by executing various control programs stored in ROM 12 and HDD 14. Throughout this specification, it is noted that the term "digital certificate" used herein represents any types of digital data to which a signature to prevent falsification is attached.

Like the upper-level apparatus 10, the lower-level apparatus 20 includes CPU 21, ROM 22, RAM 23, HDD 24, a communication interface (I/F) 25 and a system bus 26, and these components are connected via the system bus 26. In order to implement some functions of the upper-level apparatus 10, such as a communication function, a prohibition function, an authentication function, a request execution function and a distribution function, CPU 21 controls operation of the upper-level apparatus 10 by executing various control programs stored in ROM 22 and HDD 24 as needed.

It is noted that the upper-level apparatus 10 and the lower-level apparatus 20 may have various structures depending on applications thereof, such as remote management and electric-commerce. Also, the upper-level apparatus 10 and the lower-level apparatus 20 may be implemented by suitable known computers. If necessary, additional hardware elements may be included in the upper-level apparatus 10 and/or the lower-level apparatus 20. Furthermore, the upper-level apparatus 10 and the lower-level apparatus 20 do not have to be configured to have the same structure.

An exemplary communication scheme between the upper-level apparatus 10 and the lower-level apparatus 20 in the communication system according to an embodiment of the present invention is described.

FIG. 7 shows an outline of an exemplary communication scheme between the upper-level apparatus 10 and the lower-level apparatus 20 according to an embodiment of the present invention.

Figure 2A:
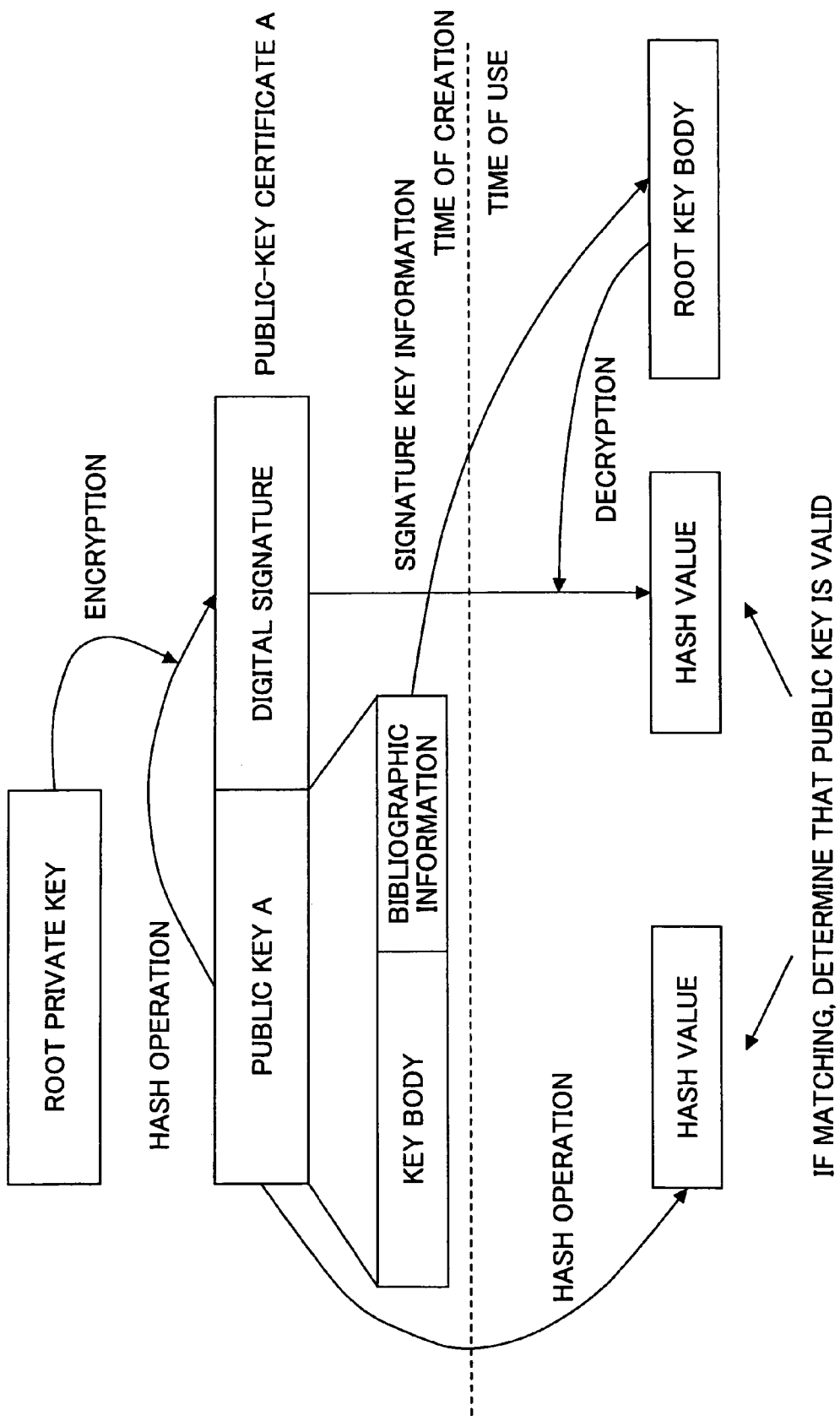
FIGS. 2A and 2B show exemplary relations among a root key, a root private key and a public-key certificate in authentication shown in FIG. 1.
Figure 2B:
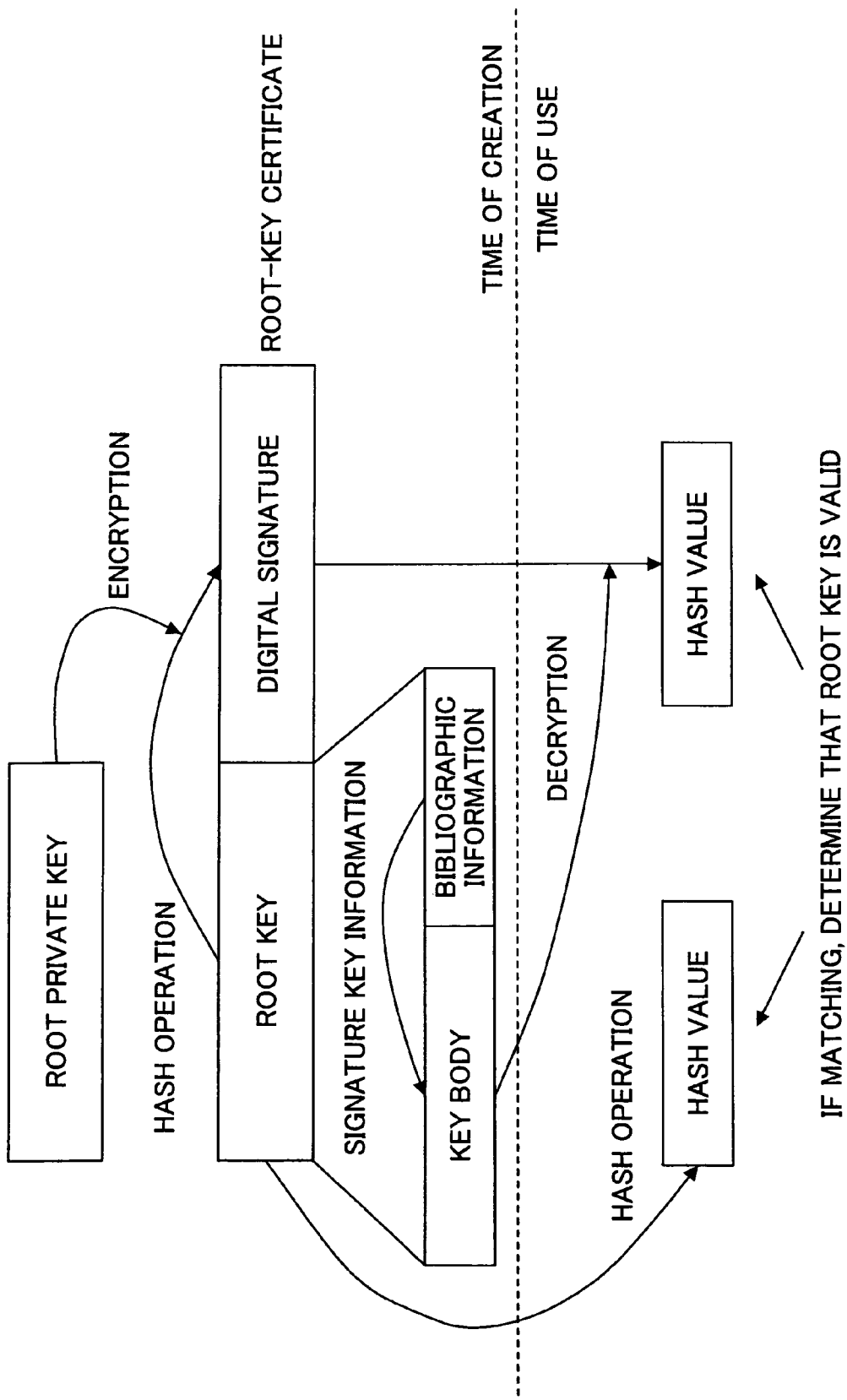
Figure 3:
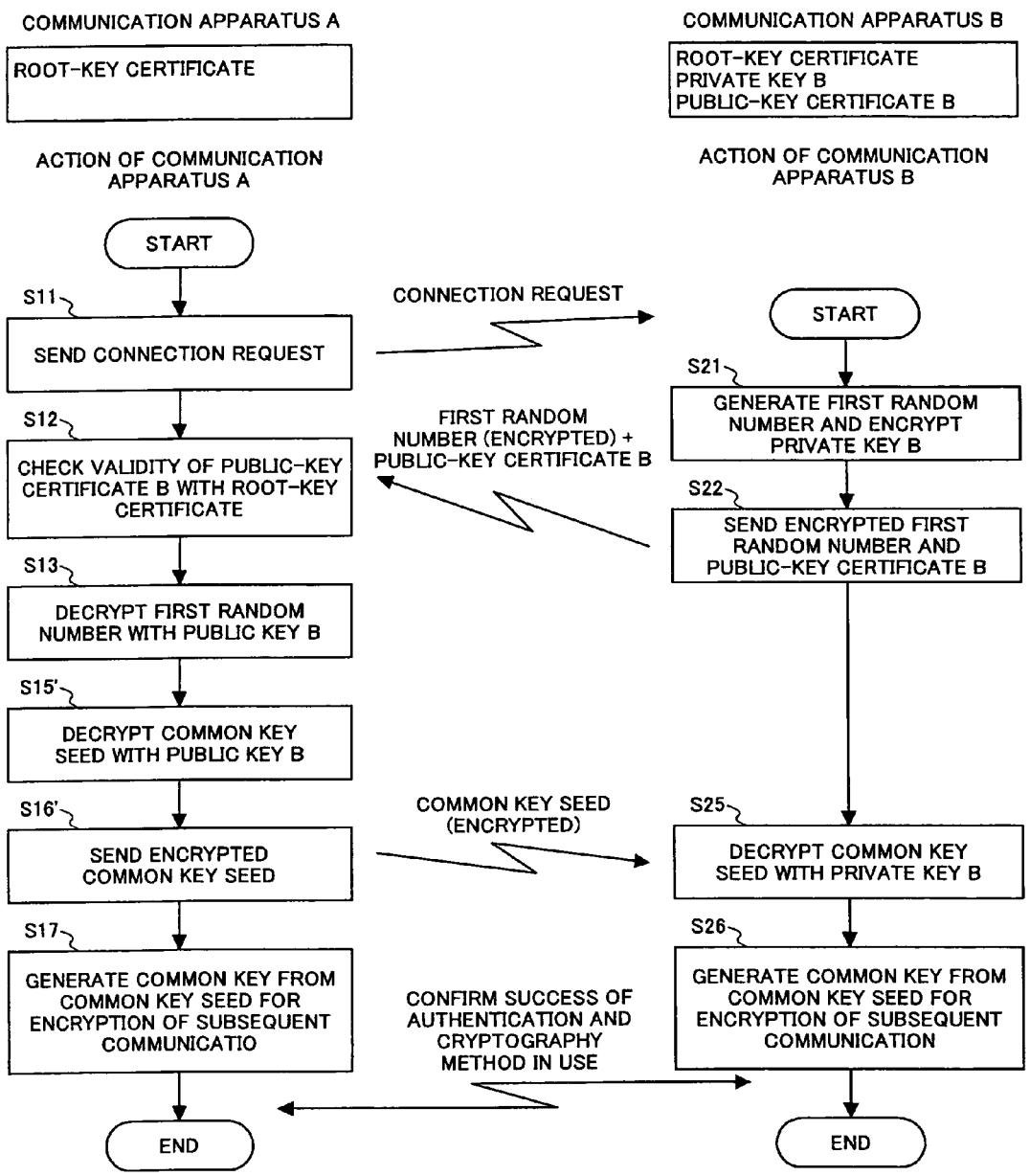
FIG. 3 is a flowchart of exemplary respective operations executed by communication apparatuses for conventional one-directional certification in compliance with SSL.

Referring to FIG. 7, in the communication system, when the upper-level apparatus 10 attempts to communicate to the lower-level apparatus 20, the upper-level apparatus 10 first requests the lower-level apparatus 20 to establish communication to the upper-level apparatus 10. Then, if the upper-level apparatus 10 authenticates the lower-level apparatus 20 as an authorized communicating party based on a result of the authentication process in compliance with SSL protocol, as described previously with respect to FIG. 1 and FIG. 3, the communication is established between the upper-level apparatus 10 and the lower-level apparatus 20. This authentication process is conventionally referred to as "SSL handshake". It is noted that cross-certification is not necessarily performed. One-directional authentication, as illustrated in FIG. 3, may be adopted.

In this authentication process, the lower-level apparatus 20 is authenticated by sending a public-key certificate thereof to the upper-level apparatus 10. In addition, if the cross-certification is used, in turn, the upper-level apparatus 10 is also authenticated by sending a public-key certificate thereof to the lower-level apparatus 20. However, in one-directional authentication, the upper-level apparatus 10 may not be authenticated.

If the above two-directional or one-directional authentication is successfully completed, the upper-level apparatus 10 generates a process request for a method of an application program installed to the lower-level apparatus 20 in form of a SOAP (Simple Object Access Protocol) message 60 described in XML format, which is a structured language form, and sends the SOAP message 60 as a HTTP request to the lower-level apparatus 20 in accordance with HTTP (Hyper Text Transfer Protocol). Such a request is called RPC (Remote Procedure Call).

In response to receipt of the process request, the lower-level apparatus 20 performs a process corresponding to the request. The lower-level apparatus 20 generates the process result as a response SOAP message 70, and returns the SOAP message 70 as a HTTP response to the upper-level apparatus 10. In order to realize secure communication, these request and response are encrypted with a common key shared between the communication apparatuses 10 and 20 through previous SSL handshake, and then the encrypted request and response are exchanged between the communication apparatuses 10 and 20.

If these request and response are exchanged between the communication apparatuses 10 and 20, the communication system can be considered as a client-server system having the upper-level apparatus 10 as a client and the lower-level apparatus 20 as a server. Also, RPC can be implemented through not only the above-mentioned technique but also existing protocols, techniques and specifications such as FTP (File Transfer Protocol), COM (Component Object Model) and CORBA (Common Object Request Broker Architecture).

Exemplary features and applications of certificates and keys that the upper-level apparatus 10 and the lower-level apparatus 20 use as authentication information in the above-mentioned authentication process are described.

Figure 8A:
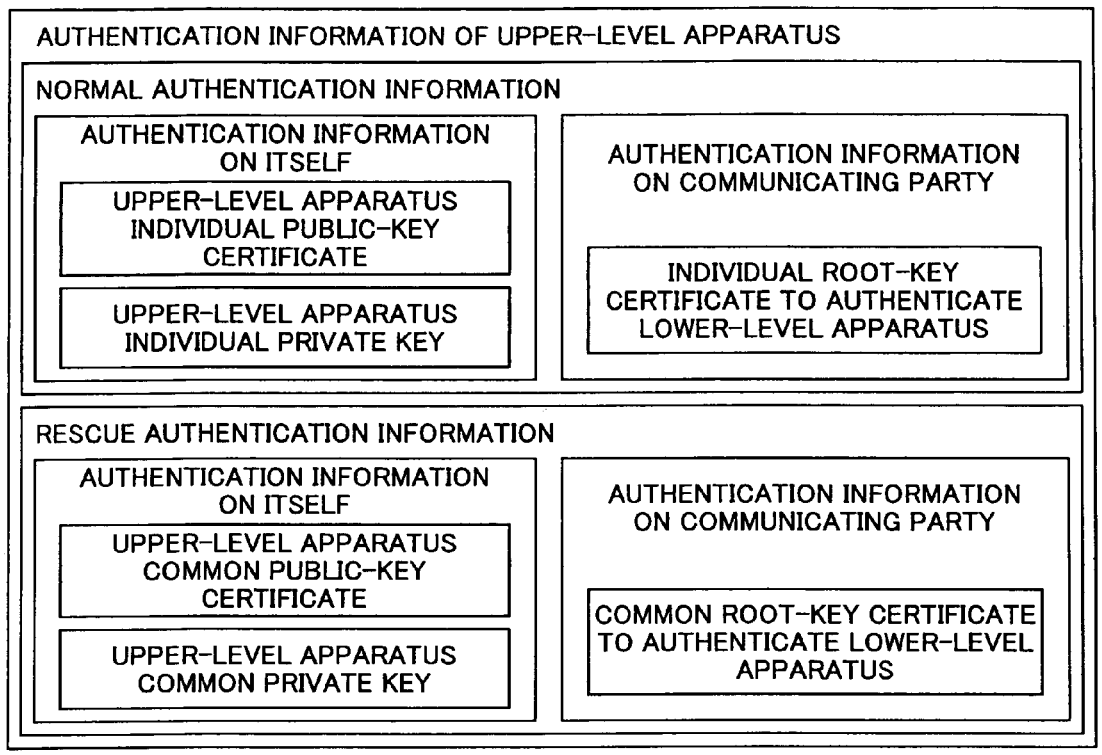
FIGS. 8A and 8B show certificates and keys stored as authentication information in the upper-level apparatus and the lower-level apparatus, respectively, according to an embodiment of the present invention.
Figure 8B:
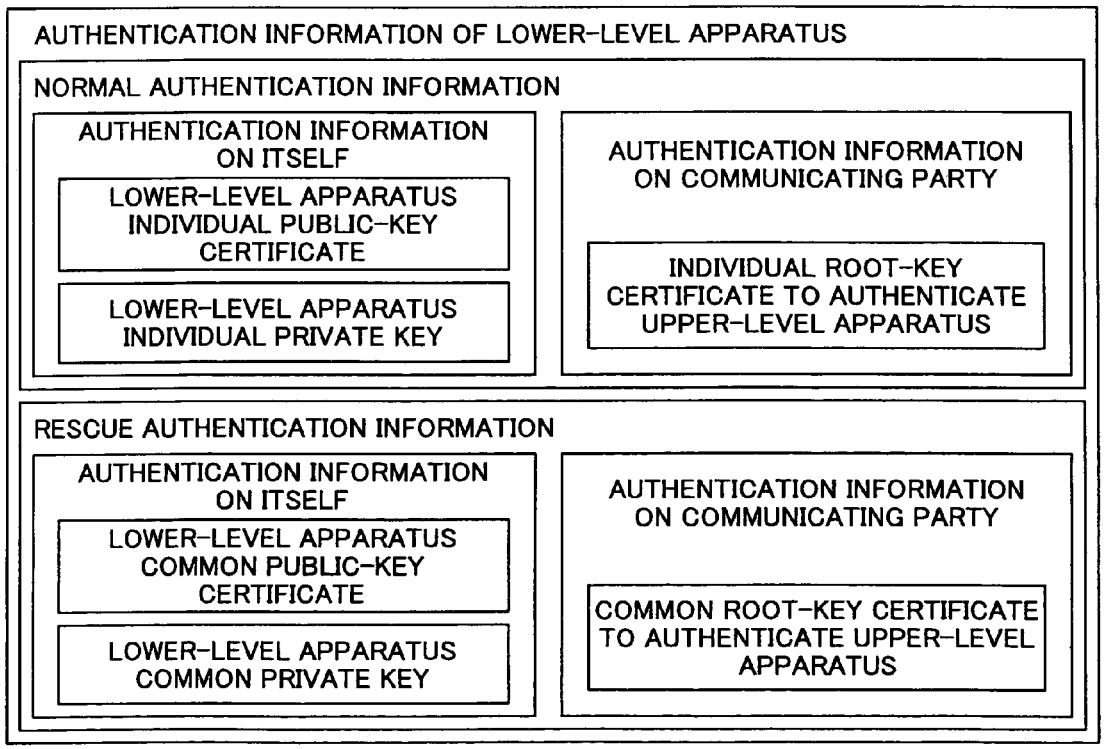

FIG. 8A schematically shows exemplary types of certificates and keys stored as authentication information in the upper-level apparatus 10. FIG. 8B schematically shows exemplary types of certificates and keys stored as authentication information in the lower-level apparatus 20.

Referring to FIGS. 8A and 8B, the upper-level apparatus 10 and the lower-level apparatus 20, if broadly classified, store normal authentication information and rescue authentication information. Further, each of these two information classes includes a public-key certificate and a private key used as authentication information on its own, and a root-key certificate used as authentication information on a communicating party.

Also, for example, a lower-level apparatus individual public-key certificate belongs to an individual digital certificate class. The lower-level apparatus individual public-key certificate is a digital certificate created by attaching a digital signature, which can verify the certificate with the aid of an individual root key to authenticate the lower-level apparatus, to an individual public key issued to the lower-level apparatus 20 by CA (not illustrated).

Figures 9, 10:
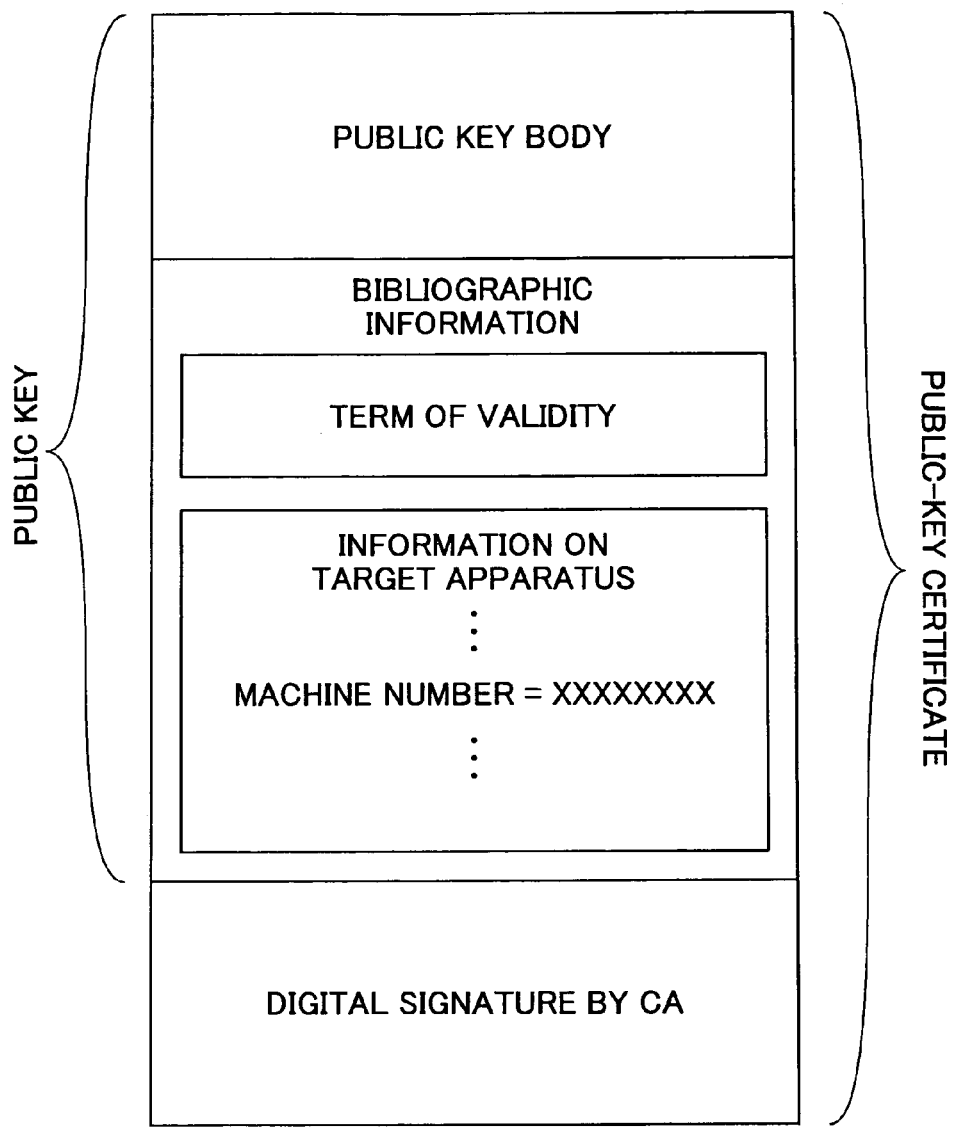
FIG. 9 shows an exemplary data structure of a lower-level individual public-key certificate shown in FIG. 8B.
FIG. 10 shows an exemplary URL to designate a communicating party in a communication request issued to a server by a client.

FIG. 9 shows an exemplary structure of a lower-level apparatus individual public-key certificate according to an embodiment of the present invention. In the illustrated individual public-key certificate, its bibliographic information includes machine number information of the lower-level apparatus 20 as identification information thereof. In addition, the machine number information may further include the type number of the lower-level apparatus 20 and information related to registered users. In addition, some information items other than the machine number information may be included, as long as these information items can identify the lower-level apparatus 20.

Referring back to FIGS. 8A and 8B, a lower-level apparatus individual private key is a private key paired with the associated individual public key. An individual root-key certificate to authenticate a lower-level apparatus is a digital certificate created by attaching a digital signature, which can verify the certificate by itself with the aid of the corresponding root private key, to an individual root key to authenticate the lower-level apparatus. If a plurality of lower-level apparatuses 20 are provided to the communication system as illustrated in FIG. 6, a digital signature generated by a uniform root private key is attached to respective individual public keys of the lower-level apparatuses 20, and a uniform individual root key certificate to verify validity thereof is used in common throughout the lower-level apparatuses 20. Even in this case, however, individual public keys in the individual public-key certificates and the corresponding private keys are made different among the individual lower-level apparatuses 20. on the other hand, in the upper-level apparatus 10, an upper-level apparatus individual public-key certificate, an upper-level apparatus individual private key and an upper-level apparatus individual root-key certificate have the same relation as the above-mentioned certificate and keys for the lower-level apparatus 20 in the communication system.

Here, for example, if the upper-level apparatus 10 and the lower-level apparatus 20 use normal authentication information to cross-authenticate each other, the lower-level apparatus 20, in response to receipt of a communication request from the upper-level apparatus 10, sends to the upper-level apparatus 10 a first random number encrypted with a lower-level apparatus individual private key together with a lower-level apparatus individual public-key certificate. The upper-level apparatus 10, first, uses an individual root-key certificate to authenticate a lower-level apparatus to check validity of the received lower-level apparatus individual public-key certificate, that is, to check whether the received certificate has been damaged or tampered in course of transmission. If it is determined that the received lower-level apparatus individual public-key certificate is valid, the upper-level apparatus 10 decrypts the received first random number with the public key included in the lower-level apparatus individual public-key certificate. If the decryption is successfully completed, the upper-level apparatus 10 can determine that the lower-level apparatus 20, to which the upper-level apparatus 10 is currently communicating, is an authorized party to which the lower-level individual public-key certificate was issued, and additionally can identify the lower-level apparatus 20 based on identification information in the received lower-level apparatus individual public-key certificate. Then, the authentication is determined depending on qualification of the identified apparatus as a communicating party.

If the authentication is successfully completed by the upper-level apparatus 10, in turn, the lower-level apparatus 20 also receives an upper-level individual public-key certificate and a random number encrypted with an upper-level apparatus individual private key from the upper-level apparatus 10, and can perform the same authentication by using a root-key certificate to authenticate an upper-level apparatus stored therein.

Meanwhile, these public-key certificate and private key are periodically updated in general. However, as described previously, there is a risk that authentication employing an individual public-key certificate cannot be performed due to some reasons. For example, failure of updating may damage the certificate and/or key. Also, the public-key certificate may expire, because the public-key certificate persists in a condition of not being updated due to careless power OFF of the apparatus. Also, there is a case where the public-key certificate and/or the private key are removed due to replacement of parts having the public-key certificate. In these cases, such damaged or removed certificate and private key have to be stored again so that authentication employing an individual public-key certificate can be resumed.

Here, if each apparatus were able to perform authentication with only an individual public-key certificate, there would be no secure transmission method of securely transmitting a new individual public-key certificate to the apparatus via the network 30. According to the present invention, however, each apparatus in the communication system is configured to store rescue authentication information to address such situations. As a result, it is possible to securely transmit a new individual public-key certificate to the apparatus that needs the certificate via the network 30 by using the stored rescue authentication information.

The rescue authentication information includes the almost same contents as those of the above-mentioned normal authentication information. For example, a lower-level common public-key certificate belongs to a common certificate class, and is a digital certificate created by attaching a digital signature, which can verify validity thereof with the aid of a lower-level apparatus common root key, to a common public key issued by CA to a lower-level apparatus. A lower-level apparatus common private key is a private key associated with the corresponding common public key. A common root-key certificate to authenticate an upper-level apparatus is a digital certificate created by attaching a digital signature, which can verify validity thereof by itself, to a common root key to authenticate an upper-level apparatus.

However, the rescue authentication information differs vastly from the normal authentication information in that bibliographic information of a common public-key certificate does not include identification information of the apparatus and in that additionally the same common public-key certificate can be stored in all apparatuses located at the same level of the communication system. Here, it is supposed that the illustrated communication system in FIG. 4 and FIG. 6 includes two levels of an upper-level apparatus 10 and at least one lower-level apparatus 20. In these cases, since apparatuses at the same level do not have to be differentiated, the same common public key and the same common private key are available. Thus, since a uniform common public-key certificate can be used among communicating parties at a certain level, these communicating parties can have the same root-key certificate each other. Accordingly, even if a plurality of lower-level apparatuses 20 are provided in the communication system, the same rescue authentication information can be stored in all the lower-level apparatuses 20.

That also holds for the upper-level apparatus 10.

In a case where the rescue authentication information and the normal authentication information are configured to have the same data format, in order to differentiate the rescue authentication information from the normal authentication information, for example, the machine number shown in FIG. 9 may be set as "0" to represent that the certificate is a common public-key certificate.

Such rescue authentication information can be made uniform to all apparatuses at the same level. Thus, in fabrication of components with respective storage areas for storing certificates, it is possible to store uniform rescue authentication information in the components depending on the type of apparatuses to which the components are to be mounted. At this time, the rescue authentication information is set not to be updated subsequently. According to this embodiment, even if authentication becomes impossible with an individual public-key certificate due to updating failure or damage of normal authentication information as described above, authentication is still possible by using a common public-key certificate in the rescue authentication information.

In this embodiment, as described above, the identification information of an apparatus is not attached to a common public-key certificate. Thus, if such a common public-key certificate is used to authenticate a communicating party, it is impossible to completely identify the communicating party. Even in this case, however, some degree of information on the communicating party can be still obtained.

Specifically, for example, a certain vendor may store lower-level apparatus rescue authentication information in all of its apparatuses corresponding to the lower-level apparatus 20 and upper-level apparatus rescue authentication information in all of its apparatuses corresponding to the upper-level apparatus 10, which can communicate to the apparatuses corresponding to the lower-level apparatus 20. In this configuration, if authentication is successfully completed, the lower-level apparatus 20 can determine that a party sending a public-key certificate to check validity with a common root-key certificate to authenticate an upper-level apparatus of the common authentication information stored therein is an upper-level apparatus 10 of the same vendor. On the other hand, the upper-level apparatus 10 can also determine that a party sending a public-key certificate to check validity with a common root-key certificate to authenticate a lower-level apparatus of the common authentication information stored therein is a lower-level apparatus 20 of the same vendor.

As a result, even if the identification information cannot be referred to, determination can be made at some degree as to whether an apparatus that requested or is requesting communication is a qualified apparatus.

If the authentication is successfully completed, a secure communication path can be established by using a common key shared between the communicating parties. Accordingly, if machine number information on the communicating parties is exchanged between them after establishment of the secure communication path, the communicating parties can be identified each other.

Also, in this embodiment, the authentication information shown in FIGS. 8A and 8B may have the same individual root-key certificate regardless of an authenticated target. For example, the individual root-key certificate to authenticate an upper-level apparatus and the individual root-key certificate to authenticate a lower-level apparatus may be the same. This is why identification information of an apparatus is attached to an individual public-key certificate, and if the individual public-key certificate is determined to be valid by using a root-key certificate, it is possible to identify the type and level of the apparatus with reference to the identification information. On the other hand, since the identification information is not attached to common certificates, the type thereof is determined based on whether the validity can be checked with a certain root-key certificate. Thus, it is preferable to differentiate common root-key certificates for each group of authenticated targets.

Meanwhile, since the lower-level apparatus 20, which works as a server in this embodiment, cannot identify a party requesting communication in SSL handshake, the lower-level apparatus 20 basically sends a uniform public-key certificate to all parties. However, in the present communication system, the lower-level apparatus 20 can selectively use an individual public-key certificate and a common public key depending on situations.

FIG. 10 is a diagram illustrating an exemplary URL used to designate a communication address in a communication request from a client to a server in a communication system according to an embodiment of the present invention.

Referring to FIG. 10, in this communication system, the lower-level apparatus 20 is designed to accept a communication request via a plurality of addresses and provide a public-key certificate corresponding to an address accepting the communication request. For example, if the lower-level apparatus 20 receives a communication request via a first address indicated as URL "https://123.45.67.89:10000", which is referred to as "normal URL", the lower-level apparatus 20 sends a lower-level apparatus individual public-key certificate to the requesting apparatus. On the other hand, if the lower-level apparatus 20 receives a communication request via a second address indicated as URL "https://123.45.67.90:10001", which is referred to as "rescue URL", the lower-level apparatus 20 sends a lower-level apparatus common public-key certificate to the requesting apparatus.

According to this communication system, the single lower-level apparatus 20 is able to distinguish the communication request, and selectively provide the corresponding public-key certificate in SSL handshake.

Of course, the upper-level apparatus 10, which works as a client, recognizes the lower-level apparatus to which the upper-level apparatus 10 has sent the communication request. Thus, if cross-certification is performed, the upper-level apparatus 10 can selectively send a public-key certificate suitable for the designated address.

It is noted that the URL includes some information items indicative of a host, a port of the host and a URL path, as illustrated in FIG. 10. The information item indicative of a URL path, as illustrated in the reference numeral 41 in FIG. 7, is included in a HTTP request having a SOAP message transmitted after successful completion of SSL handshake, and cannot be referred to during the SSL handshake. For this reason, in order to represent an address receiving a communication request as URL, the address is specified based on a combination of an IP (Internet Protocol) address, which is used as the information item indicative of the host, and a port number of the host. Alternatively, the address may be specified based on only one of the IP address and the port number. In this case, the non-used information item can be substituted for common information.

In this manner, according to the communication system, authentication is normally performed between the upper-level apparatus 10 and the lower-level apparatus 20 by using an individual public-key certificate. Then, even if the individual public-key certificate becomes unavailable because of damage thereof or other reasons, it is possible to ensure a secure communication path through authentication employing a common public-key certificate. Here, even if the authentication is performed with the common public-key certificate, a common key can be exchanged between the upper-level apparatus 10 and the lower-level apparatus 20 as in the case of employing individual public-key certificate. Then, new normal authentication information is sent from the upper-level apparatus 10 to the lower-level apparatus 10 via this secure communication path, and then stored in the lower-level apparatus 20. As a result, it is possible to restore the lower-level apparatus 20 into a status where authentication can be subsequently performed by using the normal authentication information.

According to the communication system, as described above, it is possible to easily maintain the status where the lower-level apparatus 20 can be properly authenticated by using rescue authentication information in addition to normal authentication information. However, the rescue authentication information, including a common public-key certificate, is not updated. Furthermore, uniform rescue authentication information is stored in all apparatuses belonging to the same level. Thus, leaking of the rescue authentication information must have a significant influence on communication security.

In order to alleviate this influence as much as possible, the communication system is designed to restrict functionality that is allowed to be executed in case of SSL handshake employing a common public-key certificate. Since a new individual public-key certificate can be stored in the lower-level apparatus 20 after authentication with the common public-key certificate, another SSL handshake can be established by using this newly stored individual public-key certificate. Thus, it is sufficient that only an operation to store such a new individual public-key certificate in the lower-level apparatus 20 is permitted under the SSL handshake employing a common public-key certificate.

Accordingly, the communication system is designed in such a way that if the upper-level apparatus 10 and the lower-level apparatus 20 communicate to each other via rescue URL, which is dedicated to SSL handshake employing a common public-key certificate, no operation other than an operation to set an individual public-key certificate in the lower-level apparatus 20 can be executed. According to the communication system, it is possible to realize securer communication while the advantage of authentication in use of a common public-key certificate is satisfactorily maintained.

Next, exemplary structure and operation of the communication system to implement the above-mentioned feature and advantage are roughly described with reference to FIG. 11.

Figure 11:
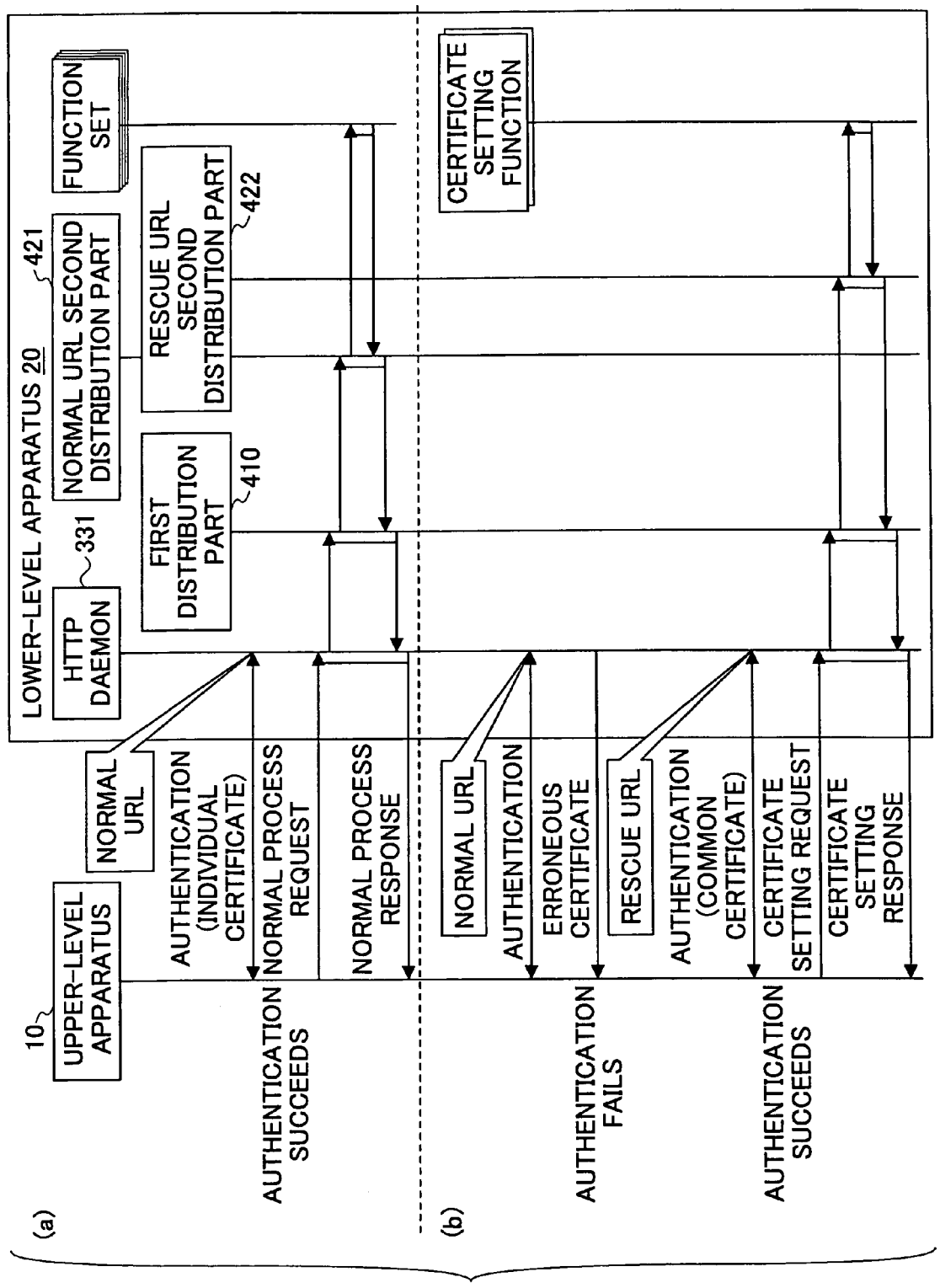
FIG. 11 is a sequence diagram of an exemplary operation of the communication system shown in FIG. 4.

FIG. 11 is a sequence diagram illustrating an exemplary operation of the communication system according to an embodiment of the present invention.

Referring to FIG. 11, in a normal operation of the communication system, as illustrated in the upper portion (a) of the diagram, the upper-level apparatus 10 sends a communication request to a normal URL of the lower-level apparatus 20, and if authentication is successfully completed with an individual certificate, the upper-level apparatus 10 can send requests to the lower-level apparatus 20 to make use of various functions of the lower-level apparatus 20.

Although the following components of the lower-level apparatus 20 are described in detail below, at this time point, the lower-level apparatus 20 receives a HTTP request via a HTTP daemon to control HTTP communication. Then, a first distribution part 410 distributes the request to either of second distribution parts 421 and 422 based on URL receiving the request. In the upper portion (a), since the request is received via the normal URL, the first distribution part 410 distributes the request to the second distribution part 421 associated with the normal URL.

Then, the normal URL second distribution part 421 distributes the received request to a function unit corresponding to the type of the request so as to cause the function unit to perform the function. After the distribution, the lower-level apparatus 20 returns a HTTP response to the upper-level apparatus 10 along the inverse process path. In this manner, the lower-level apparatus 20 performs an operation responsive to the request from the upper-level apparatus 10. For the case where the lower-level apparatus 20 receives the request via the normal URL, the lower-level apparatus 20 is allowed to execute any types of operations corresponding to request types.

It is noted that an individual certificate used to perform authentication for communication via normal URL includes identification information of the lower-level apparatus 20. Thus, if the individual certificate is used to initiate SSL handshake, it is possible to identify the lower-level apparatus 20 within the SSL handshake.

For this reason, compared to a case of acquiring identification information by executing another command after the SSL handshake, it is possible to effectively prevent "spoofing" of a communicating party. Also, even if a private key is leaked, the third party unjustly obtaining the leaked private key can spoof only the apparatus to which the private key was issued. In this case, if the leaked private key is simply renewed for the apparatus, such "spoofing" can be prevented. As a result, it is possible to obtain highly secure communication.

Alternatively, if the upper-level apparatus 10 manages the lower-level apparatus 20, the upper-level apparatus 10 can perform management by identifying the apparatus to be managed with reference to identification information included in an individual certificate. As a result, compared to the case of acquiring the identification information separately, it is possible to smoothly conduct the management by executing a simple operation.

On the other hand, in the case where the lower-level apparatus 20 cannot send an individual certificate due to damage thereof and/or other defects, as illustrated in the lower portion (b) in FIG. 11, authentication would fail. Under this case, the upper-level apparatus 10 cannot make use of functions of the lower-level apparatus 20. Thus, the upper-level apparatus 10 sends a communication request to the lower-level apparatus 20 via rescue URL so that authentication can be performed with a common certificate. Then, if the authentication succeeds, the upper-level apparatus 10 requests the lower-level apparatus 20 to set a new individual certificate. Then, the lower-level apparatus 20 uses some certificate setting functions to update the damaged individual certificate into the new one.

Here, if a request is received via the rescue URL, the first distribution part 410 distributes the request to the rescue URL second distribution part 422. Then, the rescue URL second distribution part 422 distributes a process associated with the request to a function unit corresponding to the request type. Unlike the normal URL second distribution part 421, however, the rescue URL second distribution part 422 distributes only a request to set an individual certificate to a corresponding function unit, and on the other hand, ignores requests other than such an individual certificate setting request. Namely, in this case, the lower-level apparatus 20 is designed in such a way that no process other than an individual certificate setting process is allowed to be executed.

After a proper individual certificate is set in the lower-level apparatus 20 through the above operation, the upper-level apparatus 10 and the lower-level apparatus 20 can communicate via the normal URL as illustrated in the upper-portion (a) in FIG. 10.

According to the communication system, even if an individual certificate of the lower-level apparatus 20 becomes unavailable due to damage thereof and/or other defects, the lower-level apparatus 20 can be restored quickly into the normal status where authentication employing an individual certificate can be performed. Thus, it is possible to maintain the lower-level apparatus 20 in the status of normal authentication being performed. Also, since no one is involved in the above operation, it is possible to take such advantage easily without necessity of human resources.

Actually, when the individual certificate is updated as described above, the upper-level apparatus 10 follows the procedure as follows. Specifically, the upper-level apparatus 10 first obtains identification information from the lower-level apparatus 20, and sends the identification information to CA (not illustrated). In response to receipt of the identification information, CA issues a certificate for the lower-level apparatus 20, which is the source apparatus of the identification information. The upper-level apparatus 10 obtains the certificate from CA, and sends the certificate together with a certificate setting request to the lower-level apparatus 20 so as to set the certificate in the lower-level apparatus 20. In another embodiment, the upper-level apparatus 10 may be provided with such CA function so that the upper-level apparatus 10 can issue the certificate by itself.

Also, when an individual public-key certificate is issued to be stored in the lower-level apparatus 20, the body of a public key accommodated in the individual public key certificate and/or the corresponding private key may be newly generated. In another embodiment, if CA manages a key that CA has previously issued to the lower-level apparatus 20, the key may be reused. Also, when a certificate for update is issued, a root private key may be newly issued to upgrade a current public-key certificate.

Next, an exemplary functional structure of the lower-level apparatus 20 is described with reference to FIG. 12.

Figure 12:
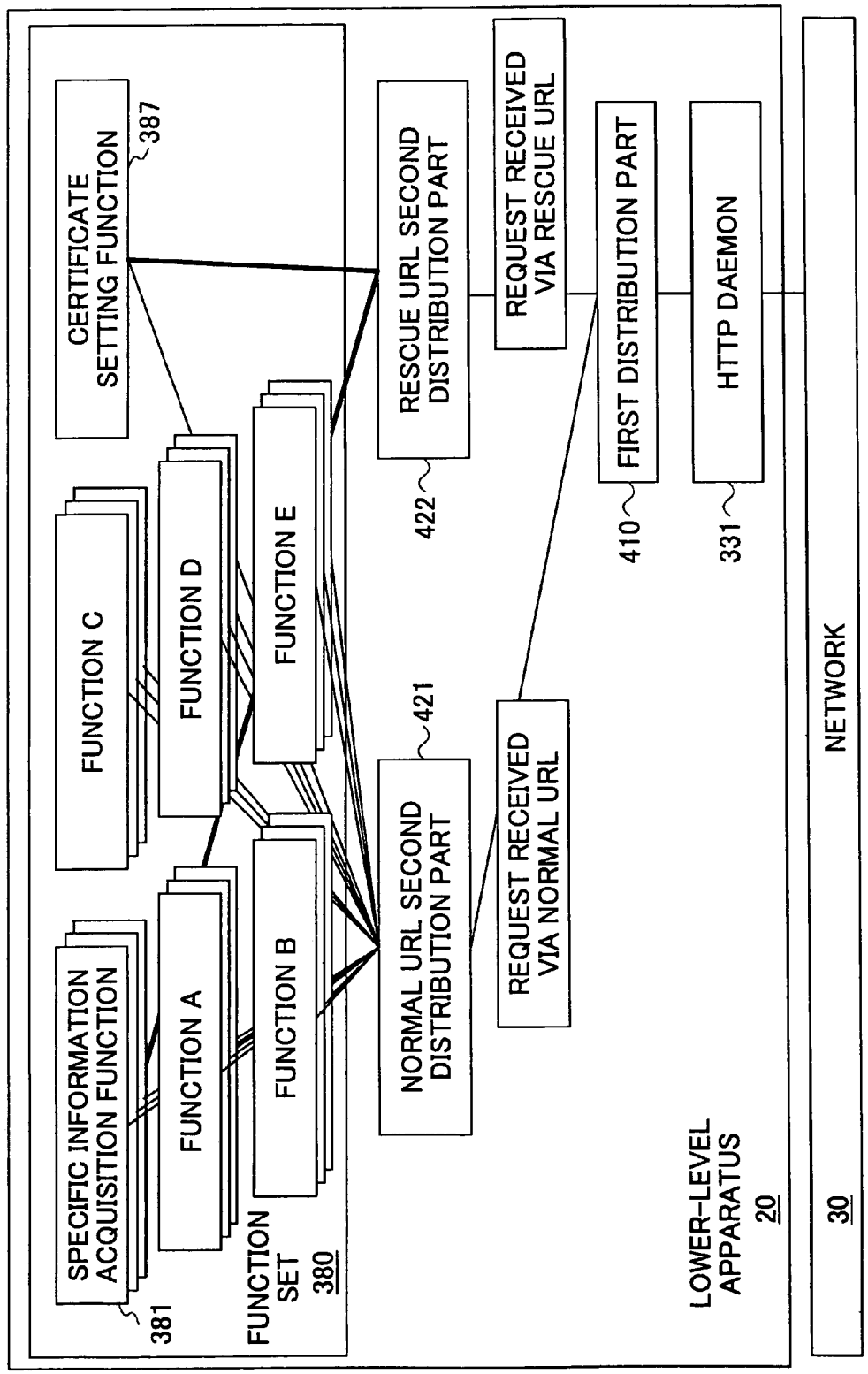
FIG. 12 is a block diagram illustrating an exemplary functional structure of the lower-level apparatus shown in FIG. 4.

FIG. 12 is a block diagram illustrating an exemplary functional structure of the lower-level apparatus 20 according to an embodiment of the present invention. It is noted that components and function units described below are implemented through execution of suitable software programs by CPU of the lower-level apparatus 20.

Referring to FIG. 12, the lower-level apparatus 20 includes a HTTP daemon 331, a first distribution part 410, a normal URL second distribution part 421, a rescue URL second distribution part 422 and a function set 380. The function set 380 includes a specific information acquisition function unit 381 and a certificate setting function unit 387. These components and function units correspond to those shown in FIG. 11.

The HTTP daemon 331 controls HTTP communication and performs SSL handshake. Also, the HTTP daemon 331 can send a HTTP request received after successful establishment of SSL handshake together with received URL information to the first distribution part 410. It is noted that this URL can be recognized through a TCP (Transmission Control Protocol) connection request in the receipt of the HTTP request. In addition, the HTTP daemon 331 can implement a communication function.

In the illustrated embodiment, only the single first distribution part 410 is shown. In another embodiment, the lower-level apparatus 20 may be designed to have a plurality of applications to provide various functions, and for each application, one first distribution part may be provided to distribute a request associated with a function provided by the application. In this case, the HTTP daemon 331 distributes a HTTP request to a first distribution part associated with a URL path included in the HTTP request.

The first distribution part 410 can distributes requests (commands), which are described in form of SOAP messages, received by the HTTP daemon 331 as HTTP requests to either of the second distribution parts 421 or 422 depending on URLs via which the requests have been received. In this embodiment, the lower-level apparatus 20 stores a table, as illustrated in FIG. 13, to indicate which of the second distribution parts 421 and 422 should receive requests depending on URLs receiving the requests. The first distribution part 410 determines which of the second distribution parts 421 and 422 should handle a given request with reference to the table. In this embodiment, a request received via the normal URL is distributed to the normal URL second distribution part 421, and on the other hand, a request received via the rescue URL is distributed to the rescue URL second distribution part 422.

Each of the second distribution parts 421 and 422 includes a XML processor, and can use the XML processor to parse a XML code of a HTML body of a HTTP request and convert the XML code into DOM (Document Object Model)-tree structured data to represent relations between XML-based tags as a tree structure. This DOM-tree structure data is formed to have a structured data type to indicate the structure of a request message. In this case, each of the second distribution parts 421 and 422 can work as message conversion means of the lower-level apparatus 20.

In addition, each of the second distribution parts 421 and 422 includes a XML serializer, and can use the XML serializer to inversely convert DOM-tree structured data into XML formatted data.

Furthermore, each of the second distribution parts 421 and 422 parses the generated DOM-tree structured data, and then extracts a data portion related to the request type. Then, the DOM-tree structured data together with HTTP header information, which is header information of the HTTP request, is distributed to a function unit of the function set 380 corresponding to the extracted data portion so as to request the function unit to execute a process corresponding to the request.

Here, the normal URL second distribution part 421 and the rescue URL second distribution part 422 have different distribution rules, which are described in detail below.

Also, such a data portion related to the request type, for example, includes the name of a child node of "Body" node representing a SOAP body of the DOM-tree structured data. Alternatively, the data portion may be URI (Uniform Resource Identifier) included in SOAPAction header of the HTTP request. It is noted that this information is included in the HTTP header information.

Also, the function set 380 corresponds to a request execution part, and each function unit of the function set 380 corresponds to a request processing part. The function units are implemented by software programs to execute processes corresponding to received requests. Each function unit of the function set 380 is activated by the normal URL second distribution part 421 or the rescue URL second distribution part 422. Each function unit executes logic in accordance with received data, and returns the process result to a requesting second distribution part.

In addition, the function set 380 can parse DOM-tree structured data supplied from the second distribution parts 421 and 422, and convert the data format of the DOM-tree structure data into another data format that can be processed in a programming language in which logic of each function unit is described. Furthermore, the function set 380 can convert result data representing an execution result of a program into DOM-tree structured data. In this embodiment, logic of each function unit of the function set 380 is described, for example, in C language, and this data format corresponds to structured data of C language.

Although function units other than the specific information acquisition function unit 381 and the certificate setting function unit 387 are not specified in FIG. 12, the function set 380 is configured to include a function or functions depending on request type(s).

The specific information acquisition function unit 381 acquires information items specific to the lower-level apparatus 20, including identification information, such as ID (machine number), model name, firmware version, optional components and certificate version. If separate requests to acquire these information items are prepared, software items to execute these requests are designed as respective programs that can be called separately.

On the other hand, the certificate setting function unit 387 can set an individual public-key certificate. Such an individual public-key certificate is set in the lower-level apparatus 20 by setting an entire certificate set configuring normal authentication information.

For example, other function units of the function set 380 may include a status acquisition function unit to provide status information of the lower-level apparatus 20 to a requesting apparatus, a log information acquisition function unit to provide log information of the lower-level apparatus 20 to a requesting apparatus, a set value information to provide a set value or values for the lower-level apparatus 20 to a requesting apparatus and an adjustment function unit to adjust the lower-level apparatus 20. Based on configuration of the lower-level apparatus 20, relationship between the lower-level apparatus 20 and the upper-level apparatus 10 and/or other factors, it can be determined what function unit(s) should be included in the function set 380.

Also, although not illustrated, a plurality of applications executed by the lower-level apparatus 20 may provide a function set similar to the function set 380 depending on respective functions of the applications.

By the way, the normal URL second distribution part 421 distributes all types of requests to corresponding function units of the lower-level apparatus 20. On the other hand, the rescue URL second distribution part 422, however, distributes only a request to set an individual public-key certificate in the lower-level apparatus 20 to corresponding function unit(s), as described with respect to FIG. 11. The rescue URL second distribution part 421, in response to receipt of the other types of requests, returns a response representing that the corresponding function unit is not allowed to be executed.

In this embodiment, such individual public-key certificate setting requests includes a request to acquire individual information required to create an individual public-key certificate, including description of information, and a request to set the individual public-key certificate. These requests correspond to the specific information acquisition function unit 381 to acquire ID, model name, certificate and version information and the certificate setting function unit 387. In other embodiments, for example, other types of requests may be also handled as the individual public-key certificate setting request. In contrast, an individual information acquisition request may be handled as the public-key certificate setting request. Finally, designers of the communication system can determine what request types should be handled as the individual public-key certificate setting request.

The above-mentioned distribution can be implemented as illustrated in FIGS. 14A and 14B. Namely, a table representing a correspondence between request types and function units to which requests should be distributed is prepared for each second distribution part. Each second distribution part distributes requests to associated function units with reference to the table. Requests not listed in such a table may be handled as ones with which no function unit is associated.

In this configuration, when the lower-level apparatus 20 receives requests via normal URL, the lower-level apparatus 20 permits all types of requests. On the other hand, when the lower-level apparatus 20 receives requests via rescue URL, the requests are distributed from the first distribution part 410 to the rescue URL second distribution part 422. In this case, any request other than those to set an individual public-key certificate is not distributed. As a result, any process associated with the other requests is prohibited. Thus, the first distribution part 410 and the rescue URL second distribution part 422 can cooperatively work as a denial part.

Also, if the lower-level apparatus 20 receives a request via the rescue URL, the lower-level apparatus 20 may be configured in such a way that the HTTP daemon 331 does not deliver the request to any application other than the application to set an individual public-key certificate. Alternatively, a pair of a normal URL second distribution part and a rescue URL second distribution part is provided to each application, and the rescue URL second distribution part may be designed not to distribute received requests to be denied to any function unit.

According to the denial part, while the upper-level apparatus 10 and the lower-level apparatus 20 communicate each other via rescue URL for SSL handshake employing a common public-key certificate, it is possible to deny any process other than processes to set an individual public-key certificate. Thus, advantage of use of a common public-key certificate can be sufficiently maintained, and at the same time, it is possible to improve security by suppressing influence of leaking of a private key corresponding to the common certificate as much as possible.

Next, an exemplary operation of the lower-level apparatus 20 having the functional structure shown in FIG. 12 is described with reference to FIG. 15 and FIG. 16.

Figure 15:
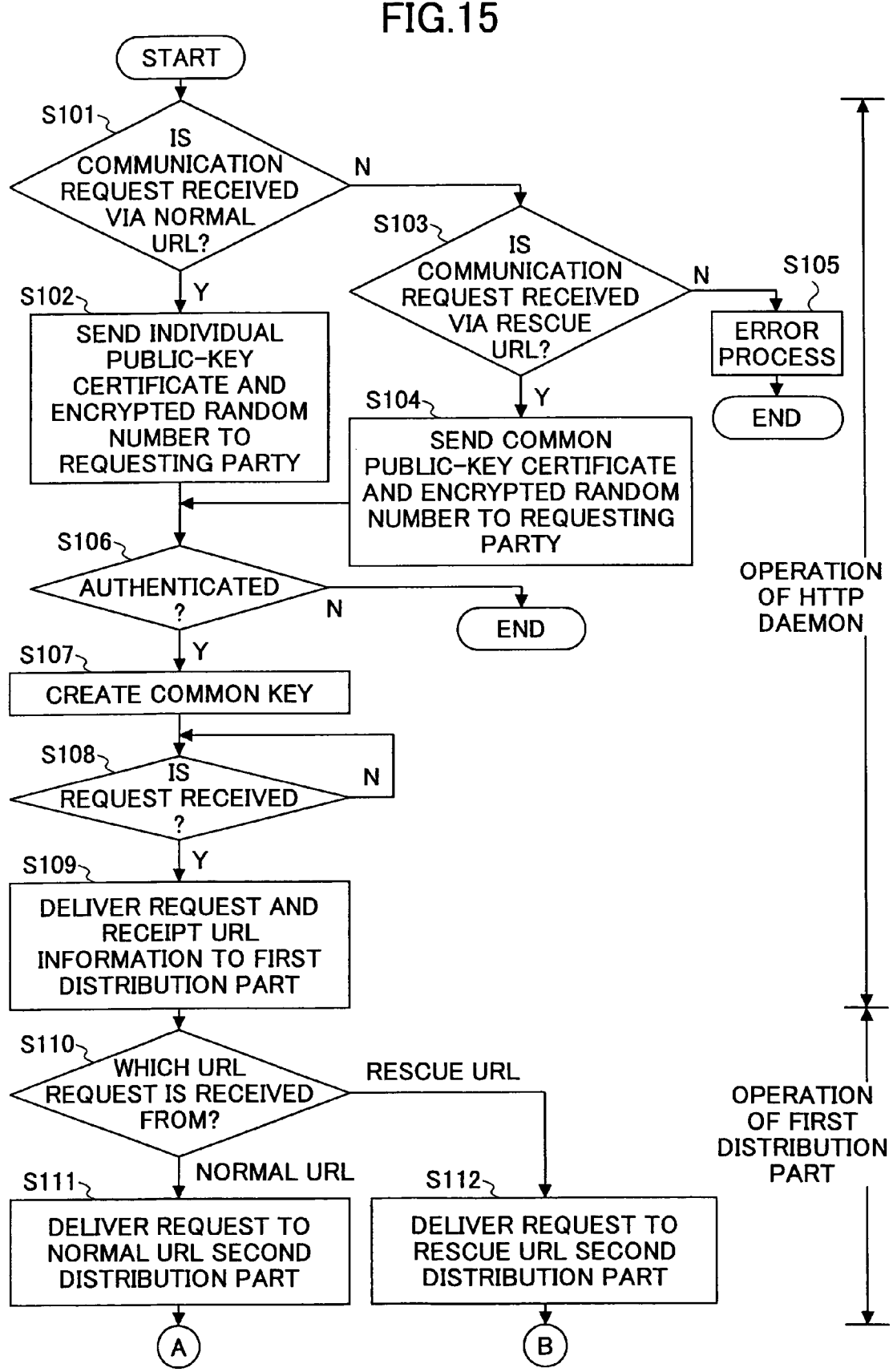
FIG. 15 is a partial flowchart of an exemplary operation of the lower-level apparatus shown in FIG. 4 in response to receipt of a communication request according to an embodiment of the present invention.
Figure 16:
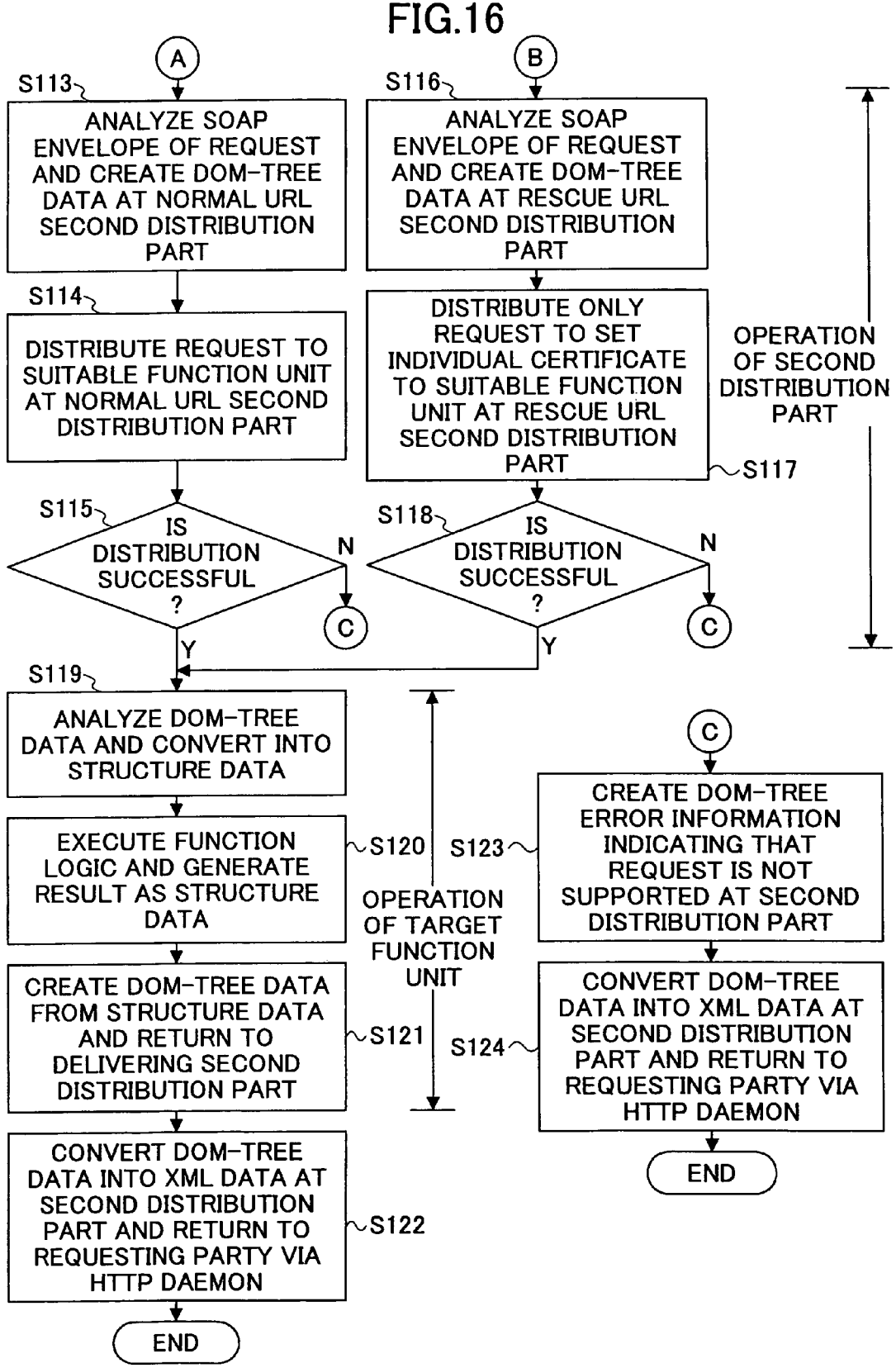
FIG. 16 is a partial flowchart of the exemplary operation shown in FIG. 15.

FIG. 15 and FIG. 16 are a flowchart of an exemplary operation performed in response to receipt of a communication request by the lower-level apparatus 20 according to an embodiment of the present invention. This operation relates to a communication apparatus control method according to an embodiment of the present invention. In this operation, one-directional authentication is adopted, that is, a communicating party authenticates only the lower-level apparatus 20. However, the present invention is not limited to this embodiment. In another embodiment, cross-certification may be adopted.

CPU of the lower-level apparatus 20 always runs the HTTP daemon 331. In response to receipt of a communication request from another communication apparatus, the lower-level apparatus 20 initiates the operation in accordance with the flowchart of FIG. 15 and FIG. 16.

In this operation, the lower-level apparatus 20 determines whether URL receiving the communication request is normal URL at step S101. If the URL is normal URL (S101: Y), the lower-level apparatus 20 requests authentication by sending a lower-level apparatus individual public-key certificate together with a first random number encrypted with a lower-level apparatus individual private key to the requesting apparatus at step S102. In other words, an individual certificate is delivered to the requesting apparatus in this case.

At step S106, the lower-level apparatus 20 waits for a response from the requesting apparatus, and if the lower-level apparatus 20 is not authenticated, the operation is terminated. On the other hand, if the lower-level apparatus 20 is authenticated, the lower-level apparatus 20 creates a common key from a common key seed received in the authentication process at step S107.

At step S108, the lower-level apparatus 20 waits for a HTTP request from the requesting apparatus, and if the lower-level apparatus 20 receives a HTTP request, the lower-level apparatus 20 delivers the HTTP request together with received URL information to the first distribution part 410. It is noted that the HTTP daemon 331 of the lower-level apparatus 20 is mainly responsible for the above-mentioned steps, as illustrated in the right-hand side of FIG. 15.

On the other hand, if the URL receiving the communication request is not normal URL (S101: N), the lower-level apparatus 20 determines whether the URL is rescue URL at step S103. If the URL is rescue URL (S103: Y), the lower-level apparatus 20 requests authentication by sending a lower-level common public-key certificate together with a first random number encrypted with a lower-level apparatus common private key to the requesting apparatus at step S104. In other words, the lower-level apparatus 20 sends a common certificate to the requesting apparatus in this case.

Then, steps S106 through S109 are performed as described above. On the other hand, if the URL is not rescue URL (S103: N), the lower-level apparatus 20 determines that the communication request has been sent to URL that does not accept communication, and performs an error process at step S105. Then, the operation is terminated.

Subsequently, the first distribution part 410, in response to receipt of the HTTP request at step S109 from the HTTP daemon 331, determines which second distribution part should receive the HTTP request based on the received URL with reference to a table as shown in FIG. 13. Then, if the HTTP request is received via the normal URL, the first distribution part 410 delivers the HTTP request to the normal URL second distribution part 421 at step S111. On the other hand, if the HTTP request is received via the rescue URL, the first distribution part 410 delivers the HTTP request to the rescue URL second distribution part 422 at step S112.

Referring to FIG. 16, the normal URL second distribution part 421 and the rescue URL second distribution part 422 parse SOAP envelopes corresponding to the HTML bodies of the HTTP requests, and create DOM-tree structured data to indicate the structures of the SOAP envelopes at steps S113 and S116, respectively.

At steps S114 and S117, the normal URL second distribution part 421 and the rescue URL second distribution part 422 distribute the HTTP requests to function units of the function set 380 associated with the types of the HTTP requests, respectively. At this time, the HTTP requests are delivered as HTTP header information and DOM-tree structured data. While the normal URL second distribution part 421 distributes requests to any associated function units of the function set 380, the rescue URL second distribution part 422 distributes only the type of request to set an individual certificate. As shown in FIGS. 14A and 14B, if the normal URL second distribution part 421 and the rescue URL second distribution part 422 refer to tables indicative of different correspondences between request types and function units, steps S114 and S117 can be performed in accordance with a uniform process.

After the distribution, the normal URL second distribution part 421 and the rescue URL second distribution part 422 determine whether the distribution has been successfully completed, that is, whether the respective tables include a function unit associated with the type of the received request, at steps S115 and S118, respectively. If the distribution has been successfully completed, both the normal URL second distribution part 421 and the rescue URL second distribution part 422 proceeds to step S119.

At step S119, when the request is distributed to the corresponding function unit of the function set 380, the function unit parses the DOM-tree data of the request, and then converts a parameter or parameters in the DOM-tree data into C language structure data. At step S120, the function unit runs its function logic to generate the process result as structure data. At step S121, the function unit converts the structure data into DOM-tree data, and returns the DOM-tree data as a response to corresponding one of the normal URL second distribution part 421 and the rescue URL second distribution part 422.

At step S122, in response to receipt of the DOM-tree data, the corresponding second distribution part uses a XML serializer thereof (not illustrated) to convert the DOM-tree data into response data in form of a XML formatted SOAP message, and returns the response data as a HTTP response to the requesting apparatus via the HTTP daemon 331. Then, the operation is terminated.

On the other hand, if the distribution is not successfully completed (S115/S118: N), the corresponding second distribution part generates DOM-tree data of error information (SOAP Fault) to indicate that the request type is not supported at step S123. At step S124, the corresponding second distribution part converts the DOM-tree data into XML formatted response data, and returns the response data as a HTTP response via the HTTP daemon 331. Then, the operation is terminated.

As described above, the operation of the lower-level apparatus 20 is performed until the distribution process of a request to a function unit in such a way that the normal URL second distribution part 421 and the rescue URL second distribution part 422 are distinguished. In other words, the operation portion to return a response can be performed without any difference between the normal URL second distribution part 421 and the rescue URL second distribution part 422. Thus, the operation portion after step S119 is illustrated without such separation.

Next, an exemplary process sequence corresponding to the above-mentioned operation in accordance with the flowchart shown in FIG. 15 and FIG. 16 is described with reference to FIG. 17.

Figure 17:
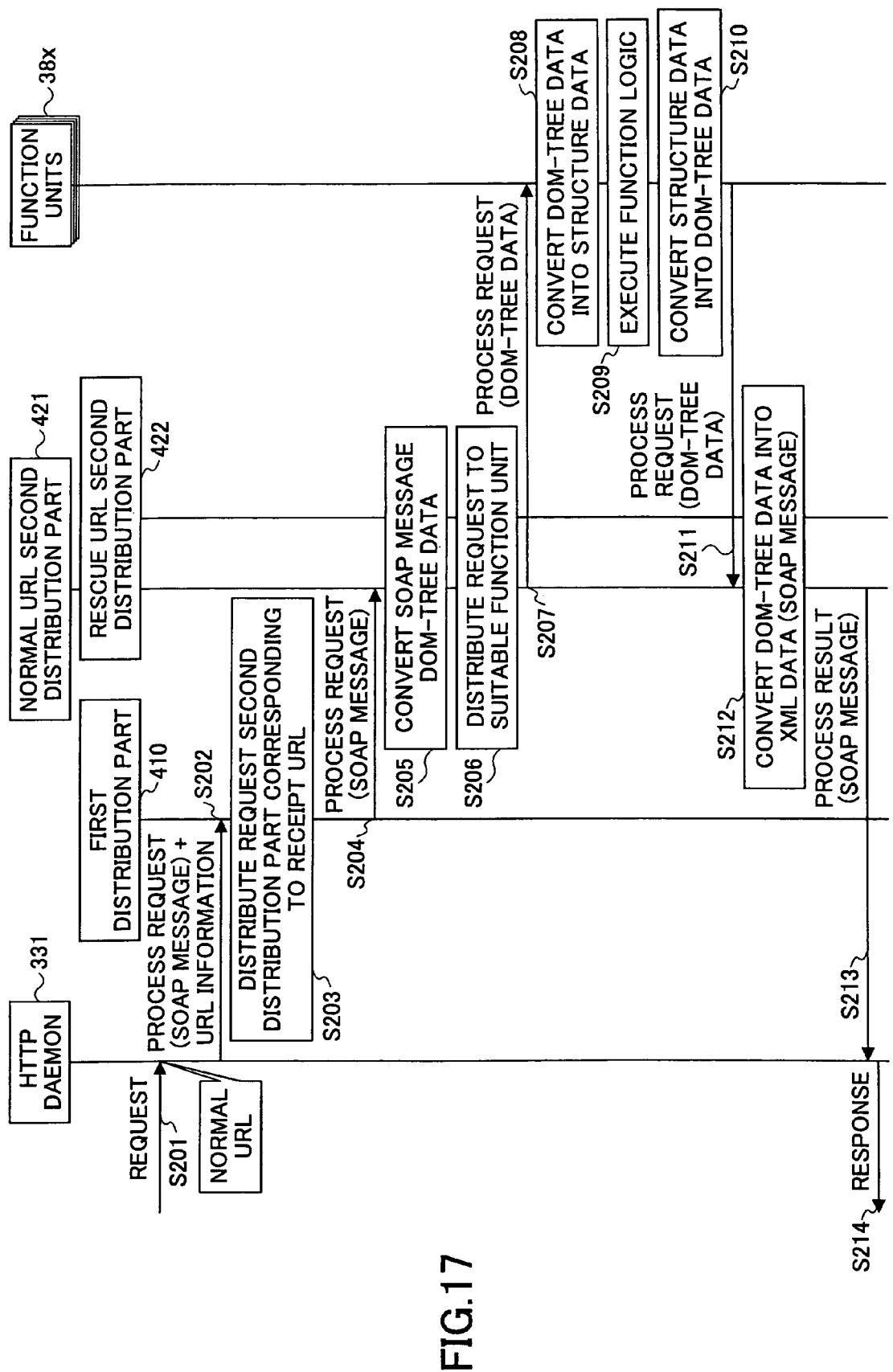
FIG. 17 is a sequence diagram of the exemplary operation shown in FIG. 15 and FIG. 16.

FIG. 17 is a sequence diagram of the process sequence according to an embodiment of the present invention. In FIG. 17, the illustration handles the case where the lower-level apparatus 20 receives a request via the normal URL.

Referring to FIG. 17, after completion of the SSL handshake process, which is omitted herein for simplicity, the upper-level apparatus 10 sends a request as a HTTP request to the lower-level apparatus 20 via the normal URL, and the HTTP daemon 331 of the lower-level apparatus 20 receives this request at step S201. This request is described as a SOAP message. In response to receipt of the request, the HTTP daemon 331 requests request distribution by sending the received request together with received URL information, such as an IP address and a port number, to the first distribution part 410 at step S202.

At step S203, the first distribution part 410 determines which of the normal URL second distribution part 421 and the rescue URL second distribution part 422 should receive the request based on the received URL information with reference to a table as shown in FIGS. 14A and 14B at step S203. In this embodiment, as described above, it is supposed that the URL information represents the normal URL. Thus, the first distribution part 410 distributes the request to the normal URL second distribution part 421, and requests the normal URL second distribution part 421 to execute a process corresponding to the request at step S204. In response to receipt of the request, the normal URL second distribution part 421 converts the request SOAP message into DOM-tree data at step S205, and determines which function unit should receive the request depending on the type of the request at step S206. At step S207, the normal URL second distribution part 421 requests a function unit 38x to execute the process by delivering the DOM-tree data to the function unit 38x.

At step S208, the function unit 38x converts the DOM-tree data into structure data processable by its logic. At step S209, the function unit 38x executes the logic by giving the structure data as an argument thereto so as to perform the process corresponding to the request. At step S210, the function unit 38x converts structure data representing the process result into DOM-tree data. At step S211, the function unit 38x delivers the DOM-tree data to the normal URL second distribution part 421.

In response to receipt of the DOM-tree data from the function unit 38x, the normal URL second distribution part 421 converts the DOM-tree data into a SOAP message response at step S212, and sends the SOAP message response as a HTTP response to the upper-level apparatus 10 via the HTTP daemon 331 at steps S213 and S214.

In this manner, the operation of the lower-level apparatus 20 in case of receiving a request via the normal URL is completed.

On the other hand, if a request is received via the rescue URL, lower-level apparatus 20 performs an almost similar operation. In this case, the first distribution part 410 distributes the request to the rescue URL second distribution part 422. Then, the rescue URL second distribution part 422 distributes only a request to set an individual public-key certificate to a function unit 38x, whereas the rescue URL second distribution part 422 handles other types of requests as ones having no associated function unit. In this case, while such an almost similar operation to the case of receiving the request via the normal URL is performed, any requests other than an individual certificate setting request can be denied.

Next, exemplary HTTP request and HTTP response are described with reference to FIG. 18 through FIG. 21. Here, the HTTP request is sent from the upper-level apparatus 10 to the lower-level apparatus 20, and the HTTP response is sent from the lower-level apparatus 20 to the upper-level apparatus 10.

FIG. 18 shows exemplary HTTP codes of a certificate setting request delivered from the upper-level apparatus 10 to a rescue URL of the lower-level apparatus 20.

Referring to FIG. 18, the HTTP request is a SOAP message in accordance with SOAP, as described previously, and a SOAPAction header 61 is attached to the last line of the HTTP header. A portion below the SOAPAction header 61 corresponds to a SOAP envelope, and request contents are described in the SOAP body of the SOAP envelope. In the illustrated HTTP request, information to indicate that the request is for setting a certificate is described in a line 62 immediately below "Body". Below the line 62, a parameter 63 to indicate a certificate version, a parameter 64 to indicate an encryption password of the certificate, and a parameter 65 to indicate data generated by encrypting and Base64-encoding the certificate to be set are described. The request type can be determined by referring to the line 62 or the last portion of the SOAPAction header 61. The second distribution parts distribute requests to function units in accordance with the information.

FIG. 19 shows exemplary HTTP codes of a HTTP response to the HTTP request shown in FIG. 18.

Referring to FIG. 19, the HTTP response is a SOAP message, and includes the HTTP header and the SOAP envelope. In the SOAP body, a line 71 indicates the executed request type, and a line 72 indicates that the execution result is "OK". In contrast, if the request has not been successfully completed, although attempt of update succeeded, the line 72 is described as "NG".

FIG. 20 shows another exemplary HTTP request sent from the upper-level apparatus 10 to a rescue URL of the lower-level apparatus 20.

Referring to FIG. 20, the HTTP request is a SOAP message, and is for acquiring the status of the lower-level apparatus 20. Since the HTTP request differs from that shown in FIG. 18 in terms of the request type, the last portion of the SOAPAction header 81 and the contents of the SOAP body differ from those shown in FIG. 18. Below "Body", only a line 82 to indicate that the request is for acquiring the status of the lower-level apparatus 20 is illustrated, and the other parameters are not described.

FIG. 21 shows an exemplary HTTP response to the HTTP request shown in FIG. 20.

Referring to FIG. 21, a status acquisition request is not distributed in case of receipt via a rescue URL. Thus, a response to indicate that such a command does not exist is returned as SOAP Fault. This information is described in a line 91 of the SOAP body.

According to the above-mentioned communication system, even if an individual certificate is damaged, a new individual certificate can be set via a network through authentication employing a common certificate. As a result, it is possible to always maintain a condition where the lower-level apparatus 20 can be properly authenticated. In communication via a rescue URL, in which a common public-key certificate is used for SSL handshake, any process other than processes related to setting of an individual certificate is denied. Thus, while advantage of use of a common certificate is sufficiently maintained, secure communication can be realized by suppressing influence in case of leaking of the common certificate or the corresponding private key as much as possible.

Furthermore, if cross-certification is performed between the upper-level apparatus 10 and the lower-level apparatus 20 for setting of an individual certificate, it is possible to prevent the lower-level apparatus 20 from receiving and storing an individual certificate from an improper apparatus and further improve security of communication.

Exemplary variations of the above-mentioned embodiment are described.

Figure 22:
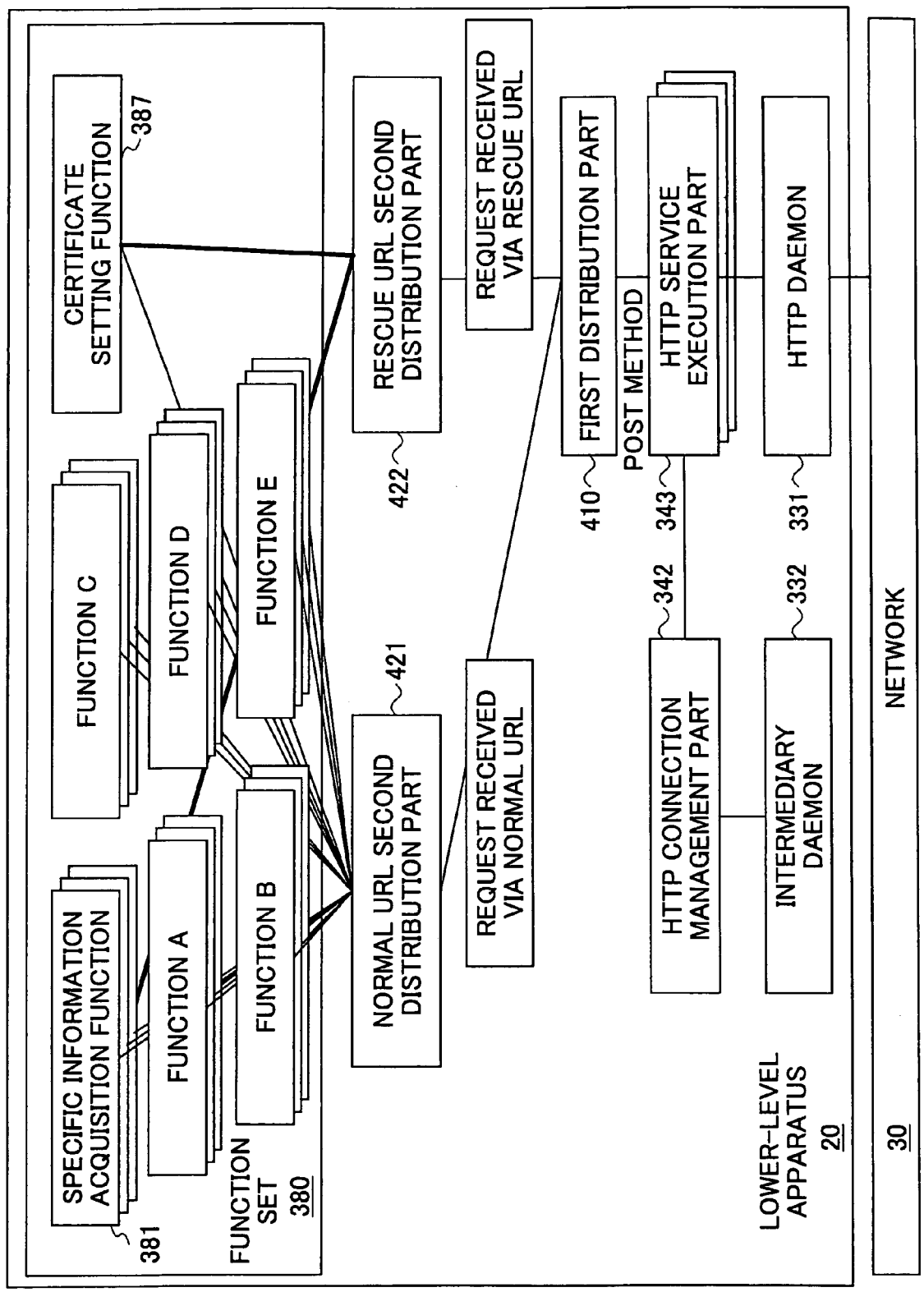
FIG. 22 is a block diagram illustrating an exemplary functional structure of a lower-level apparatus according to another embodiment of the present invention.

FIG. 22 is a block diagram illustrating an exemplary functional structure of a variation of the lower-level apparatus 20 according to an embodiment of the present invention.

In the above-mentioned embodiment, the lower-level apparatus 20 is designed to have the functional structure shown in FIG. 12. In another embodiment, the lower-level apparatus 20 may be designed as shown in FIG. 22. Referring to FIG. 22, the lower-level apparatus 20 may further include an intermediary daemon 332, a HTTP connection management part 342 and a HTTP service execution part 343.

In this embodiment, data is exchanged between the first distribution part 410 and the HTTP daemon 331 via the HTTP service execution part 343. Also, the HTTP service execution part 343 is designed to deliver only POST methods, which are considered to include operation requests related to functions of the function set 380, to the first distribution part 410. Also, the intermediary daemon 332, in response to notification on connection and disconnection of communication from the HTTP daemon 331, reports the notification to the HTTP connection management part 342. IN response to receipt of the notification, the HTTP connection management part 342 instructs the HTTP service execution part 343 to obtain a HTTP request from the HTTP daemon 331.

In this structure, if a plurality of threads corresponding to the HTTP service execution part 343 are provided, a plurality of requests from the upper-level apparatus 10 can be processed in parallel by a single application (process). As a result, it is possible to improve responsiveness of the lower-level apparatus 20 to responses from the upper-level apparatus 10. The applicant has filed patent applications, such as Japanese Patent Application 2003-081246, related to such techniques.

In the above-mentioned embodiment, a plurality of the second distribution parts are provided to the lower-level apparatus 20, and the first distribution part 410 distributes requests to an appropriate second distribution part based on received URLs.

In another embodiment, for example, only one second distribution part additionally including functions of the first distribution part 410 is provided, and this single second distribution part may distribute requests to individual functions based on both received URLs and request types. In this case, for example, a table to indicate a correspondence between the received URLs, the request types and function units associated therewith, as shown in FIG. 23, is stored in the lower-level apparatus 20. The lower-level apparatus 20 may be designed in such a way that the second distribution part distributes HTTP header information and DOM-tree data to associated function units with reference to the table.

According to this variation, it is possible to reduce the number of program modules built in the lower-level apparatus 20. Here, if the lower-level apparatus 20 has the structure shown in FIG. 12, URL information does not have to be delivered to the second distribution part earlier than the first distribution part. Thus, the structure shown in FIG. 12 may be better in terms of simplification of an interface between modules.

Also, in the above-mentioned embodiment, each function unit of the function set 380 is capable of converting DOM-tree data into structure data, and vice versa. In another embodiment, the function set 380 may further include a handler to execute such data conversion separately from the function units. According to this embodiment, since each function unit can receive data in format that the function unit can directly process, it is possible to develop the function units without knowledge of SOAP and XML.

Furthermore, in the above-mentioned embodiment, the second distribution part is provided with functions to convert SOAP messages described in XML into DOM-tree data, and vice versa. The present invention is not limited to this configuration. In another embodiment, each function unit is designed to directly handle SOAP messages, and the first distribution part 410 may directly distribute SOAP requests to individual function units with reference to a table as shown in FIG. 23.

Also, in the above-mentioned embodiment, an individual certificate with identification information of an apparatus and a common certificate without such identification information are used. The former can be handled as a high-security certificate, and on the other hand, the latter can be handled as a low-security certificate.

In general, the high-security certificate may have to include various information items. Also, the high-security certificate may be limited on exports. Furthermore, the high-security certificate may need one or more special authentication programs. For these reasons, the high-security certificate is limited on available environments. As a result, it may be difficult to store an individual certificate in every apparatus in the same way and use the individual certificate for authentication. On the other hand, a low-security certificate is less limited than the individual certificate, and it may be relatively easy to store a uniform common certificate in every apparatus and use the common certificate for authentication.

Consequently, there is a demand that an apparatus is produced to have a low-security certificate in advance before distribution thereof so that a high-security certificate can be stored afterward in the apparatus depending on use environments thereof. In this case, the operation of the above-mentioned embodiment may be used. Specifically, in communication via an address used for authentication with a low-security certificate, any process other than ones to set a high-security certificate is prohibited. As a result, while advantage of use of a low-security certificate can be sufficiently maintained, it is possible to realize high security by suppressing influence of leaking of the low-security certificate and/or a corresponding private key.

Also, in the above-mentioned embodiment, the upper-level apparatus 10 and/or the lower-level apparatus 20 are authenticated in accordance with SSL. However, the present invention is not limited to this scheme.

The present invention is applicable to TLS (Transport Layer Security), which is developed by improving SSL.

Also, in the present invention, the description format of a request is not limited to a SOAP message. In the case where a request can be accepted as information described in form of a structure language as in the above-mentioned embodiment, it is possible to improve versatility of data and design and modify data format easily. However, in other embodiments, a request may be described in other formats.

Also, in the above-mentioned embodiment, CA is provided separately from the upper-level apparatus 10. However, the present invention is not limited to this configuration. In another embodiment, CA may be integrally provided to the upper-level apparatus 10. In this case, CA may be configured in such a way that components thereof, such as CPU, ROM and RAM, are individually mounted. Alternatively, CA may be configured in such a way that these components may be shared with the upper-level apparatus 10. In this case, the shared CPU executes an appropriate software program so that the upper-level apparatus 10 can operate as CA.

Furthermore, as described previously, the upper-level apparatus 10 and the lower-level apparatus 20 can have various structures depending on purposes. Also in this case, the function set 380 may include various function units depending on types and structures of the apparatus. If any process other than ones to set an individual certificate is denied in case of authentication with a common certificate, it is possible to obtain the same advantage as the above-mentioned embodiment. In another embodiment, such accepted processes in common certificate authentication may be determined to include other types of processes as needed without limitation on only the individual certificate setting process. For example, when authentication is performed with a low-security common certificate, only a portion of function units may be limited.

In a remote management system, the lower-level apparatus 20 may be an image processing apparatus, such as a printer, a FAX machine, a copier, a scanner and a digital multifunction peripheral. Alternatively, the lower-level apparatus 20, which serves as a managed apparatus, may be a communication apparatus configured by providing a communication function to an apparatus, such as a network electric appliance, a vending machine, medical equipment, a power source device, a ventilation apparatus, a measurement system of gas supply, water supply and power supply, an automobile and an aircraft. In this case, the upper-level apparatus 10 may be a managing apparatus that collects information from such a managed apparatus and/or sends commands to the managed apparatus to execute some process.

Also, one or more programs according to the present invention causes a computer to work as the lower-level apparatus 20 that provides a digital certificate via a plurality of addresses to accept authentication from a communicating party and communicates to the communicating party via an authenticated address corresponding to the type of the digital certificate. The above-mentioned advantage is achieved by executing such programs.

These programs may be stored in storage means, such as ROM and HDD, of the computer in advance. In another embodiment, the programs may be stored in a non-volatile memory such as CD-ROM, a flexible disk, SRAM (Static RAM), EEPROM (Electrically Erasable and Programmable ROM) and a memory card. In order to perform the above-mentioned steps, the programs are installed from the storage means to a computer, and then CPU of the computer executes the programs. Alternatively, CPU reads the programs from the storage means and executes the programs.

Furthermore, the programs may be downloaded from an external apparatus having a recording medium or storage means for storing the programs.

According to the present invention, in a communication system including one or more communication apparatuses that provide digital certificates to accept communication authentication from a communicating apparatus, while high security can be maintained, it is possible to easily maintain a condition where normal authentication can be accepted. As a result, it is possible to operate the communication system with high reliability.

The present invention is not limited to the specifically disclosed embodiments, and variations and modifications may be made without departing from the scope of the present invention.

The present application is based on Japanese Patent Priority Applications No. 2003-329219 filed Sep. 22, 2003 and No. 2004-211394 filed Jul. 20, 2004, the entire contents of which are hereby incorporated by reference.

What is claimed is:

1. A communication apparatus, comprising:
a communication part configured to provide a digital certificate to a communicating party in response to a request received via a plurality of addresses so as to obtain authentication and communicate to the communicating party in response to a request received via an address providing the digital certificate authenticated by the communicating party, and the communication part is further configured to provide an individual certificate with identification information of the communication apparatus as the digital certificate in response to a request received via a first address of the plurality of addresses and a common certificate without the identification information as the digital certificate in response to a request received via a second address of the plurality of addresses;
a request execution part configured to execute a process corresponding to a request received from the communicating party by the communication part; and
a denial part configured to deny any process corresponding to requests received via the second address other than requests relating to storage of the individual certificate in the communication apparatus.

2. The communication apparatus as claimed in claim 1, further comprising:
an authentication part configured to authenticate a digital certificate of the communicating party received from the communicating party, and when the authentication succeeds, permit subsequent communication,
wherein the request execution part comprises an update part, in response to receipt of the request to set an individual certificate from the communicating party, updating the individual certificate.

3. The communication apparatus as claimed in claim 1, wherein the request to set an individual certificate comprises a request to acquire individual information of the communication apparatus and a request to set the individual certificate.

4. The communication apparatus as claimed in claim 1, wherein the request execution part comprises a plurality of request processing parts, each of the request processing parts is configured to perform a predefined process corresponding to the request.

5. The communication apparatus as claimed in claim 4, further comprising:
a distribution part configured to distribute a request to one of the plurality of request processing parts in accordance with an address receiving the request and a type of the request,
wherein the denial part is further configured to prevent the distribution part from distributing any request other than at least one predetermined request to any of the plurality of request processing parts depending on an address in use.

6. The communication apparatus as claimed in claim 1, wherein the request is described as a SOAP message.

7. The communication apparatus as claimed in claim 1, wherein the authentication is performed in accordance with SSL or TLS, and the digital certificate comprises a public-key certificate used for the authentication.

8. A communication system, comprising:
at least one lower-level apparatus; and
at least one upper-level apparatus communicating to the at least one lower-level apparatus as a communicating party,
wherein the at least one lower-level apparatus comprises a communication part configured to provide a digital certificate to the communicating party in response to a request received via a plurality of addresses so as to obtain authentication and configured to communicate to the communicating party in response to a request received via an address providing the digital certificate authenticated by the communicating party, and
the communication part is further configured to provide an individual certificate with identification information of the communication apparatus as the digital certificate in response to a request received via a first address of the plurality of addresses and a common certificate without the identification information as the digital certificate in response to a request received via a second address of the plurality of addresses;
a request execution part configured to execute a process corresponding to a request received from the communicating party by the communication part; and
a denial part configured to deny any process corresponding to requests received via the second address other than requests relating to storage of the individual certificate in the communication apparatus, and
wherein the at least one upper-level apparatus comprises an authentication part configured to authenticate the at least one lower-level apparatus by using a digital certificate received from the at least one lower-level apparatus.

9. The communication system as claimed in claim 8, wherein the lower-level apparatus further comprises an authentication part configured to authenticate a digital certificate of the communicating party received from the communicating party, and when the authentication succeeds, permit subsequent communication, and the request execution part comprises an update part, in response to receipt of the request to set an individual certificate from the communicating party, updating the individual certificate.

10. The communication system as claimed in claim 8, wherein the request to set an individual certificate comprises a request to acquire individual information of the lower-level apparatus and a request to set the individual information.

11. The communication system as claimed in claim 8, wherein the request is described as a SOAP message.

12. The communication system as claimed in claim 8, wherein the authentication is performed in accordance with SSL or TLS, and the digital certificate comprises a public-key certificate used for the authentication.

13. A method of controlling a communication apparatus, comprising causing the communication apparatus to perform steps of:
providing a digital certificate via a plurality of addresses so as to obtain authentication from a communicating party, wherein an individual certificate with identification information of the communication apparatus is provided as the digital certificate in response to a request received via a first address of the plurality of addresses, and a common certificate without the identification information is provided as the digital certificate in response to a request received via a second address of the plurality of addresses;

communicating to the communicating party in response to a request received via an address providing the digital certificate authenticated by the communicating party;

performing a process corresponding to a request received from the communicating party in the communication; and denying any process corresponding to requests received via the second address other than processes relating to storage of the individual certificate.

14. The method as claimed in claim 13, further comprising steps of:

performing authentication on a digital certificate of the communicating party received from the communicating party;

permitting, when the authentication succeeds, subsequent communication; and updating, in response to receipt of the request to set an individual certificate from the communicating party, the individual certificate.

15. The method as claimed in claim 13, wherein the request to set an individual certificate comprises a request to acquire individual information of the communication apparatus and a request to set the individual information.

16. The method as claimed in claim 13, wherein the request is described as a SOAP message.

17. The method as claimed in claim 13, wherein the authentication is performed in accordance with SSL or TLS, and the digital certificate comprises a public-key certificate used for the authentication.

18. A recording medium storing a program, which when executed by a computer, causes the computer to execute a procedure comprising steps of:

providing a digital certificate via a plurality of addresses so as to obtain authentication from a communicating party, wherein an individual certificate with identification information of the communication apparatus is provided as the digital certificate in response to a request received via a first address of the plurality of addresses, and a common certificate without the identification information is provided as the digital certificate in response to a request received via a second address of the plurality of addresses;

communicating to the communicating party in response to a request received via an address providing the digital certificate authenticated by the communicating party;

performing a process corresponding to a request received from the communicating party in the communication; and denying any process corresponding to requests received via the second address other than processes relating to storage of the individual certificate.

19. The recording medium as claimed in claim 18, the procedure further comprising steps of:

performing authentication on a digital certificate of the communicating party received from the communicating party;

permitting, when the authentication succeeds, subsequent communication; and updating, in response to receipt of the request to set an individual certificate from the communicating party, the individual certificate.

20. The recording medium as claimed in claim 18, wherein the request to set an individual certificate comprises a request to acquire individual information of the communication apparatus and a request to set the individual information.

21. The recording medium as claimed in claim 18, wherein the request is described as a SOAP message.

22. The recording medium as claimed in claim 18, wherein the authentication is performed in accordance with SSL or TLS, and the digital certificate comprises a public-key certificate used for the authentication.

* * * * *